(12) United States Patent
Choi et al.

(10) Patent No.: US 12,548,219 B2
(45) Date of Patent: Feb. 10, 2026

(54) SYSTEM AND METHOD FOR HIGH-RESOLUTION 3D IMAGES USING LASER ABLATION AND MICROSCOPY

(71) Applicants: University of Connecticut, Farmington, CT (US); Aerocyonics Imaging, LLC, Stamford, CT (US)

(72) Inventors: Hongbin Choi, Farmington, CT (US); Nicholas May, Farmington, CT (US); Adrian Phoulady, Farmington, CT (US); Sina Shahbazmohamadi, Farmington, CT (US); Pouya Tavousi, Farmington, CT (US); Daniel Dimase, East Greenwich, RI (US)

(73) Assignees: University of Connecticut, Farmington, CT (US); Aerocyonics Imaging, LLC, Stamford, CT (US)

( * ) Notice: Subject to any disclaimer, the term of this patent is extended or adjusted under 35 U.S.C. 154(b) by 299 days.

(21) Appl. No.: 18/354,396

(22) Filed: Jul. 18, 2023

(65) Prior Publication Data

US 2025/0029291 A1    Jan. 23, 2025

(51) Int. Cl.
G06T 11/00    (2006.01)
G01N 1/28    (2006.01)

(52) U.S. Cl.
CPC ............ *G06T 11/003* (2013.01); *G01N 1/286* (2013.01)

(58) Field of Classification Search
None
See application file for complete search history.

(56) References Cited

U.S. PATENT DOCUMENTS 5,456,758 A    10/1995    Menon
5,853,962 A    12/1998    Bowers
(Continued)

FOREIGN PATENT DOCUMENTS

WO    2002007926 A1    1/2002

OTHER PUBLICATIONS

Ahi, K. et al. "Quality control and authentication of packaged integrated circuits using enhanced-spatial-resolution terahertz time-domain spectroscopy and imaging." Optics and Lasers in Engineering 104 (2018): 274-284.
(Continued)

*Primary Examiner* — Daniel T Tekle
(74) *Attorney, Agent, or Firm* — Michael Best & Friedrich LLP

(57) ABSTRACT

A system and method for generating a three-dimensional image of a sample. The system comprises a platform configured to support the sample, a laser source configured to output a laser beam to remove material from the sample, a microscope imaging system, and a controller communicatively coupled to the laser source and the microscope imaging system. The controller is configured to (a) acquire height data of a surface of the sample with the microscope imaging system, (b) generate a mask based on the height data of the surface of the sample, the mask providing a laser cutting pattern for the sample, (c) acquire an image and a height map of the surface of the sample with the microscope imaging system, (d) activate the laser source to generate a laser beam to delayer the sample based on the mask, and repeat steps (a)-(d) to generate a three-dimensional image of the sample.

20 Claims, 25 Drawing Sheets
(21 of 25 Drawing Sheet(s) Filed in Color)

(56) References Cited

U.S. PATENT DOCUMENTS

| | | | |
|---|---|---|---|
| 6,805,751 | B2 | 10/2004 | Allen |
| 8,716,145 | B2 | 5/2014 | Huang |
| 8,716,146 | B2 | 5/2014 | Nowling et al. |
| 8,795,542 | B2 | 8/2014 | Adhiprakasha |
| 2008/0213978 | A1 | 9/2008 | Henry et al. |
| 2010/0290016 | A1* | 11/2010 | Kaehr .................. B29C 64/129 355/77 |
| 2012/0247504 | A1 | 10/2012 | Nasr et al. |
| 2013/0200334 | A1* | 8/2013 | Zhang ................ H10H 20/8512 977/755 |
| 2022/0020114 | A1* | 1/2022 | George ................. G01S 13/89 |
| 2022/0204410 | A1* | 6/2022 | Donelon ............... C04B 35/645 |
| 2023/0373870 | A1* | 11/2023 | Walker ................ C04B 41/0054 |
| 2024/0010510 | A1* | 1/2024 | Walker .................. C01F 17/218 |
| 2024/0077712 | A1* | 3/2024 | Fujimura ................. G01N 1/28 |
| 2025/0029291 | A1* | 1/2025 | Choi ..................... G06T 11/003 |

OTHER PUBLICATIONS

Ahmadi, B. et al. "Automated detection of counterfeit ICs using machine learning." Microelectronics Reliability 88 (2018): 371-377.

Ahmadi, B., et al. "Non-destructive automatic die-level defect detection of counterfeit microelectronics using machine vision." Microelectronics Reliability 114 (2020): 113893.

Banerjee, S., et al. (2009). Scanning electron microscopy measurements of the surface roughness of paper. Industrial & Engineering Chemistry Research, 48(9), 4322-4325.

Chichkov, B. N., et al. (1996). Femtosecond, picosecond and nanosecond laser ablation of solids. Applied Physics A, 63(2), 109-115.

Choi, H., et al. "Material prediction from confocal images of lasered samples." Microscopy and Microanalysis 27.S1 (2021): 2754-2755.

Choi, H., et al. "Rapid three-dimensional reconstruction of printed circuit board using femtosecond laser delayering and digital microscopy." Microelectronics Reliability 138 (2022): 114659.

De Carvalho, GGA, et al. "Recent advances in LIBS and XRF for the analysis of plants." Journal of Analytical Atomic Spectrometry 33.6 (2018): 919-944.

Deerinck, T. J. et al. High-performance serial block-face SEM of nonconductive biological samples enabled by focal gas injectionbased charge compensation. J. Microsc. 270, 142-149 (2018).

Devarapalli, R.S. et al. "Micro-CT and FIB-SEM imaging and pore structure characterization of dolomite rock at multiple scales," Arabian Journal of Geosciences, vol. 10, p. 1-12, 2017.

Echlin, M. P., et al. (2017). Materials response to glancing incidence femtosecond laser ablation. Acta Materialia, 124, 37-46.

Echlin, M. P., et al. (2015). The TriBeam system: Femtosecond laser ablation in situ SEM. Materials Characterization, 100, 1-12.

Echlin, M.P. et al. "Serial sectioning in the SEM for three dimensional materials science," Current Opinion in Solid State and Materials Science, vol. 24, p. 100817, 2020.

Ender, M. et al. "Quantitative characterization of LiFePO4 cathodes reconstructed by FIB/SEM tomography," Journal of the electrochemical society, vol. 159, p. A972, 2012.

Hirayama, Y., et al. (2005). Heat-affected zone and ablation rate of copper ablated with femtosecond laser. Journal of Applied Physics, 97(6), 064903.

Hodgson, N., et al. (2021). Ultrafast laser machining: Process optimization and applications. Paper presented at the Laser Applications in Microelectronic and Optoelectronic Manufacturing (LAMOM) XXVI, , 11673 21-41.

Hyatt, J. A. (1984). Liquid and supercritical carbon dioxide as organic solvents. The Journal of Organic Chemistry, 49 (26), 5097-5101.

Ishitani, T., et al. (1996). Cross-sectional sample preparation by focused ion beam: A review of ion-sample interaction. Microscopy Research and Technique, 35(4), 320-333.

Jana, D. (2006). Sample preparation techniques in petrographic examinations of construction materials: A state-of-the-art review. Paper presented at the Proceedings of the Twenty-Eighth Conference on Cement Microscopy, 48.

Joos, J. et al. "Reconstruction of porous electrodes by FIB/SEM for detailed microstructure modeling," Journal of Power Sources, vol. 196, p. 7302-7307, 2011.

Kelley, K. et al. "Waffle Method: A general and flexible approach for improving throughput in FIB-milling," Nature Communications, vol. 13, p. 1-13, 2022.

Kerse, C. et al. Ablation-cooled material removal with ultrafast bursts of pulses. Nature 537, 84-88 (2016).

Klepeis, S. J., et al. (1987). A grinding/polishing tool for TEM sample preparation. MRS Online Proceedings Library (OPL), 115, 179-184.

Kornfeld, J. et al. Progress and remaining challenges in high-throughput vol. electron microscopy. Curr. Opin. Neurobiol. 50, 261-267 (2018).

Korte, F., et al. (2003). Towards nanostructuring with femtosecond laser pulses. Applied Physics A, 77(2), 229-235.

Le Harzic, R. et al. Comparison of heat-affected zones due to nanosecond and femtosecond laser pulses using transmission electronic microscopy. Appl. Phys. Lett. 80, 3886-3888 (2002).

Li, P. et al. Recent advances in focused ion beam nanofabrication for nanostructures and devices: Fundamentals and applications. Nanoscale 13, 1529-1565 (2021).

Liao, C., et al. Maskless 3D ablation of precise microhole structures in plastics using femtosecond laser pulses. ACS Appl. Mater. Interfaces. 10, 4315-4323 (2018).

May, N., et al. "Correlative multimodal imaging and targeted lasering for automated high-precision IC decapsulation." Microelectronics Reliability 138 (2022): 114660.

May, N., et al. "Single Image Composite Tomography Utilizing Large Scale Femtosecond Laser Cross-sectioning and Scanning Electron Microscopy." Microscopy and Microanalysis 28.S1 (2022): 876-878.

May, N., et al. "Three-Dimensional Reconstruction of Printed Circuit Boards: Comparative Study between 3D Femtosecond Laser Serial Sectioning and Optical Imaging versus 3D X-Ray Computed Tomography." Microscopy and Microanalysis 28.S1 (2022): 284-286.

Mayer, J., et al. (2007). TEM sample preparation and FIB-induced damage. MRS Bulletin, 32(5), 400-407.

Momma, C., et al. (1996). Short-pulse laser ablation of solid targets. Optics Communications, 129(1), 134-142.

Nail, C. (2007). Applications for parallel grinding as an alternative to chemical decapsulation in preparing packaged samples for failure analysis. Paper presented at the International Symposium for Testing and Failure Analysis, , 33 71-76.

Nan, N. et al. FIB-SEM three-dimensional tomography for characterization of carbon-based materials. Adv. Mater. Sci. Eng. 2019, 1-8 (2019).

Nelson, G. et al. "Comparison of X-ray nanotomography and FIB-SEM in quantifying the composite LSM/YSZ SOFC cathode microstructure," ECS Transactions, vol. 35, p. 2417, 2011.

Ng, K. K., et al. "Failure analysis on multilayer ceramic capacitor (MLCC) with leakage failure caused by silver (Ag) migration in molded plastic package." 2012 19th IEEE International Symposium on the Physical and Failure Analysis of Integrated Circuits. IEEE, 2012, 1-6.

Nolte, S., et al. (1997). Ablation of metals by ultrashort laser pulses. Josa B, 14(10), 2716-2722.

Nowakowski, P., et al. "Advanced tools and techniques for delayering and cross-sectioning semiconductor devices." ISTFA 2017. ASM International, 2017 (5 pages).

Park, C., et al. FIB overview. In Microelectronics Failure Analysis Desk Reference, 335-355 (2019).

Phillips, K. C., et al. (2015). Ultrafast laser processing of materials: A review. Advances in Optics and Photonics, 7 (4), 684-712.

Phoulady, A., et al. "A novel material detection method using femtosecond laser, confocal imaging and image processing enabling endpointing in fast inspection of microelectronics." Microelectronics Reliability 126 (2021): 114287.

(56) References Cited

OTHER PUBLICATIONS

Phoulady, A., et al. "Model for predicting surface properties of lasered samples." Microscopy and Microanalysis 27. S1 (2021): 3186-3189.

Phoulady, A., et al. "Rapid high-resolution volumetric imaging via laser ablation delayering and confocal imaging." Scientific Reports 12.1 (2022): 12277.

Pronko, P. P., et al. (1995). Machining of sub-micron holes using a femtosecond laser at 800 nm. Optics Communications, 114(1), 106-110.

Quadir, S. E., et al. "A survey on chip to system reverse engineering." ACM journal on emerging technologies in computing systems (JETC) 13, No. 1 (2016): 1-34.

Radziemski, L. et al. "A brief history of laser-induced breakdown spectroscopy: from the concept of atoms to LIBS 2012." Spectrochimica Acta Part B: Atomic Spectroscopy 87 (2013): 3-10.

Rublack, T., et al. Laser ablation of silicon dioxide on silicon using femtosecond near infrared laser pulses. Energy Proc. 8, 467-472 (2011).

Schmidt, C. et al. "Advanced Package FA Flow for Next-Gen Packaging Technology Using EOTPR, 3D X-Ray and Plasma FIB," in ISTFA 2016, 2016 (5 pages).

Shanjin, L. V., et al. (2006). An investigation of pulsed laser cutting of titanium alloy sheet. Optics and Lasers in Engineering, 44(10), 1067-1077.

Sharang, S., et al. Xe plasma vs gallium FIB delayering. Microsc. Microanal. 25, 904-905 (2019).

Singh, S., et al. (2005). Effect of ambient air pressure on debris redeposition during laser ablation of glass. Journal of Applied Physics, 98(11), 113520.

Sivel, V. G. M., et al. "Application of the dual-beam FIB/SEM to metals research." Journal of Microscopy 214.3 (2004): 237-245.

Stokes, D. J., et al. (2006). A new approach to studying biological and soft materials using focused ion beam scanning electron microscopy (FIB SEM). Paper presented at the Journal of Physics: Conference Series, , 26(1) 012, 50-53.

Tu, K.-N . . . "Reliability challenges in 3D IC packaging technology." Microelectronics Reliability 51, No. 3 (2011): 517-523.

Vaghasiya, H., et al. Thermal and non-thermal ablation mechanisms in crystalline silicon by femtosecond laser pulses: Classical approach of the carrier density two temperature model. J. Phys. D Appl. Phys. 55, 175109 (2022).

Villinger, C. et al. "FIB/SEM tomography with TEM-like resolution for 3D imaging of high-pressure frozen cells," Histochemistry and cell biology, vol. 138, p. 549-556, 2012.

Weinert, K., et al. (2000). Simulation of tool-grinding with finite element method. CIRP Annals, 49(1), 253-256.

Wildenschild, D. et al. "Using X-ray computed tomography in hydrology: systems, resolutions, and limitations," Journal of Hydrology, vol. 267, p. 285-297, 2002.

Withers, P. J. et al. X-ray computed tomography. Nat. Rev. Methods Primers 1, 1-21 (2021).

Wu, T., et al. (2022). Femtosecond laser textured porous nanowire structured glass for enhanced thermal imaging. Chinese Optics Letters, 20(3), 033801.

Yin, K., et al. (2017). Femtosecond laser induced robust periodic nanoripple structured mesh for highly efficient oil-water separation. Nanoscale, 9(37), 14229-14235.

Yin, K., et al. (2022). Femtosecond laser thermal accumulation-triggered micro-/nanostructures with patternable and controllable wettability towards liquid manipulating. Nano-Micro Letters, 14(1), 1-13.

Zhang, H., et al. Ultra-microtome for the preparation of TEM specimens from battery cathodes. Microsc. Microanal. 26, 867-877 (2020).

Zhang, Y. et al. 3D characterisation using plasma FIB-SEM: A large-area tomography technique for complex surfaces like black silicon. Ultramicroscopy 218, 113084 (2020).

\* cited by examiner

SYSTEM AND METHOD FOR HIGH-RESOLUTION 3D IMAGES USING LASER ABLATION AND MICROSCOPY

STATEMENT REGARDING FEDERALLY SPONSORED RESEARCH OR DEVELOPMENT

This invention was made with government support under HQ0727-21-P-0035 awarded by Defense Microelectronics Activity. The government has certain rights in the invention.

FIELD OF THE INVENTION

The present disclosure provides a system and method for obtaining high-resolution three-dimensional (3D) images of samples, such as semiconductor materials (e.g., microprocessors, memory, micro-electromechanical systems (MEMS) and other similar components). The 3D images of the samples are generated using imaging and microscopy, for example, for conducting inspections, failure analysis, and reverse engineering.

BACKGROUND

Three-dimensional images of semiconductor materials are needed to conduct thorough investigations in a wide range of applications including, but not limited to inspection, failure analysis, and reverse engineering. Various methods can be used for acquiring a 3D image of the semiconductor materials. X-ray computed tomography (X-ray CT) is one method for acquiring the 3D image. X-ray CT is a non-destructive method with resolution limitations.

As an alternative, a destructive method of acquiring 3D images may be employed that implements consecutive delayering and imaging of the sample. This destructive method presents a trade-off between throughput and image resolution. For resolutions of 10 nm or less, a repetitive delayering/imaging strategy can be used. With this strategy, a scanning electron microscope (SEM) or helium ion microscope (HIM) is used for imaging the layers of the sample, and methods such as focused ion beam (FIB) and knife technology (more suitable for biological applications) are used for removing thin layers of the sample to expose the buried layer for imaging. The two-dimensional (2D) images collected are then stacked to obtain a 3D tomographic image. The low throughput of the process practically prohibits obtaining 3D images of large regions of interest (ROIs).

The throughput issue with this strategy often allows only a tiny region of the sample to be analyzed. As a result, the context of the entire sample is lost. The throughput issue exists in imaging as well as the process of delayering. Applying a process of delayering that is comparable, both in throughput and accuracy, with optical imaging, is challenging. The use of FIB for delayering could be employed, but FIB provides a low throughput.

There are alternatives to traditional FIB, such as high current, gas-assisted, or plasma source FIB. However, these modalities sacrifice resolution for speed and still take days to remove cubic millimeters of material. Other common challenges of FIB include high cost and need for vacuum, curtaining effects, and charging artifacts for nonconductive materials. Other existing delayering techniques that potentially could have higher throughputs have precision and controllability issues.

The use of lasers for delayering a sample to conduct 3D volumetric imaging faces a fundamental challenge. In conventional 3D volumetric imaging, it is assumed that the exposed layer of the sample, at each step, has a flat topography, an assumption that is used when reconstructing the 3D image by stacking the 2D layers. Nevertheless, due to the differences in the laser ablation rate of different materials, achieving flat cuts, which are the basis of acquiring tomographic images in the conventional approach, faces challenges. Differences in the interaction of the laser beam with different chemical compositions in a multi-material sample may lead to a drastically different depth of cut across different regions of the sample. Such an effect can drastically distort the final 3D image, as schematically depicted in FIG. 1. Further, access to and applying a priori knowledge about the material composition distribution across the sample of interest cannot fully address the non-flat layer issue.

On the other hand, mechanical methods can offer fast delayering, but provide low precision and may put the sample integrity at risk. Mechanical grinding/polishing offers a relatively rough surface of the final polish and a poor vertical resolution (i.e., the distance between layers). Another major drawback of using mechanical methods is the thermal and mechanical stress that is introduced to the sample, which in some cases is detrimental to the integrity of the sample. Given that, in many applications, only one instance of the sample is at hand, this could result in losing the sample available for analysis. Further, to keep the sample intact during grinding, often an additional step of encapsulation in rigid material (e.g., epoxy), is necessary. Chemical etching has controllability, quality, and hazard disadvantages in addition to the risk of losing the only available sample. In addition, for both cases of mechanical and chemical etching, extensive trial-and-error is needed for each specific case.

Thus, systems and methods that provide imaging of samples with improved resolution, faster throughput, and reduced cost would be desirable.

SUMMARY

The present disclosure provides a system and method for obtaining high-resolution 3D images of samples where femtosecond laser ablation is used for delayering the samples. For example, the samples can comprise semiconductor materials and like components.

The present disclosure leverages optical imaging and confocal microscopy to address the challenges of obtaining adequate flat layers during the laser ablation process. In some embodiments, the method integrates confocal microscopy to acquire a height map of the exposed layer of the sample and optical imaging to acquire an optical image of the exposed layer of the sample. In some embodiments, the method acquires a height map and an optical image of each exposed layer of the sample throughout the process and uses that data in an image reconstruction process to generate the 3D image.

The height map can also be used for planning the next or future lasering steps of the sample. That is, regions of the sample that have been cut deeper than a certain threshold can be excluded from the upcoming lasering step to maintain the height variation across the region of interest within a set limit. This is referred to as "masking" or applying a "mask" to the sample. A benefit of using a mask is to ensure that the confocal images of the exposed layers can capture the entire region of interest.

As discussed herein, "masking" generally refers to a process through which selected areas of a sample are protected from other processing, such as destructive processing.

For example, a selected area may be "masked" or protected from removal, while a surrounding area is removed with a laser. A "mask" may be implemented through various techniques. For example, a mask may be generated with the addition of protective and/or sacrificial materials, or through instructions which limit/prohibit operation of testing processes (i.e., cutting, lasering, or another destructive technique) in the selected area.

As disclosed herein, femtosecond laser ablation can be used as a method for delayering a sample in combination with optical and confocal microscopy as the imaging technique for performing rapid 3D imaging. The use of confocal microscopy provides several advantages. For example, confocal microscopy may be used to eliminate distortion in a 3D image that results from non-flat layers. This distortion is caused by the difference in laser ablation rate of different materials. Additionally, confocal microscopy allows variations in height of layers of a sample to be maintained within a small range. Further, confocal microscopy enables material characterization to be based on the processing of material ablation rate at different locations.

In one embodiment, the disclosure provides a system for generating a three-dimensional image of a sample. The system comprises a platform configured to support the sample, a laser source configured to output a laser beam to remove material from the sample, a microscope imaging system, and a controller communicatively coupled to the laser source and the microscope imaging system. The controller is configured to (a) acquire height data of a surface of the sample with the microscope imaging system, (b) generate a mask based on the height data of the surface of the sample, the mask providing a laser cutting pattern for the sample, (c) acquire an image and a height map of the surface of the sample with the microscope imaging system, (d) activate the laser source to generate a laser beam to delayer the sample based on the mask, and repeat steps (a)-(d) to generate a three-dimensional image of the sample.

In another embodiment, the disclosure provides a method of generating a three-dimensional image of a PCB sample. The method comprises (a) positioning the PCB sample on a stage, (b) identifying a region of interest of the PCB sample, (c) generating fiducial marks on the region of interest of the PCB sample with a laser, (d) moving the stage relative to a confocal microscope to acquire an optical image of the PCB sample and height information of a first surface of the PCB sample, (e) generating a mask providing a laser cutting pattern to expose a second surface of the PCB sample based on the height information of the first surface of the PCB sample, (f) activating the laser to delayer the PCB sample based on the laser cutting pattern for the second surface of the PCB sample, repeating steps (d)-(f) and generating a three-dimensional image of the PCB sample based on a plurality of the optical images and the height information of the plurality of surfaces of the PCB sample.

In a further embodiment, the disclosure provides a system for generating a three-dimensional image of a sample. The system comprises a stage configured to support the sample, a laser source configured to output a laser beam to remove material from the sample, a confocal height sensor, a confocal microscope, a $CO_2$ nozzle, and a controller communicatively coupled to the stage, the laser source, the confocal height sensor, the confocal microscope, and the $CO_2$ nozzle. The controller is configured to (a) move the stage to align the sample with the confocal microscope to acquire a two-dimensional optical image and a two-dimensional height map of a first surface of the sample with the confocal microscope, (b) generate a mask based on the two-dimensional height map of the first surface of the sample, the mask providing a laser cutting pattern to expose a second surface of the sample, (c) activate the laser source to generate a laser beam to delayer the sample based on the mask, (d) activate the $CO_2$ nozzle to remove debris from the second surface of the sample, (e) process the two-dimensional image data and the two-dimensional height map for the first surface to generate a three-dimensional image of the first surface, and repeat steps (a)-(e) to generate a three-dimensional image of the sample by stacking a plurality of the three-dimensional images of each of the surfaces of the sample.

Other aspects of various embodiments will become apparent by consideration of the detailed description and accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

laser trenches on a copper substrate for repetition rate and overlap investigations (right).

Figure 11:
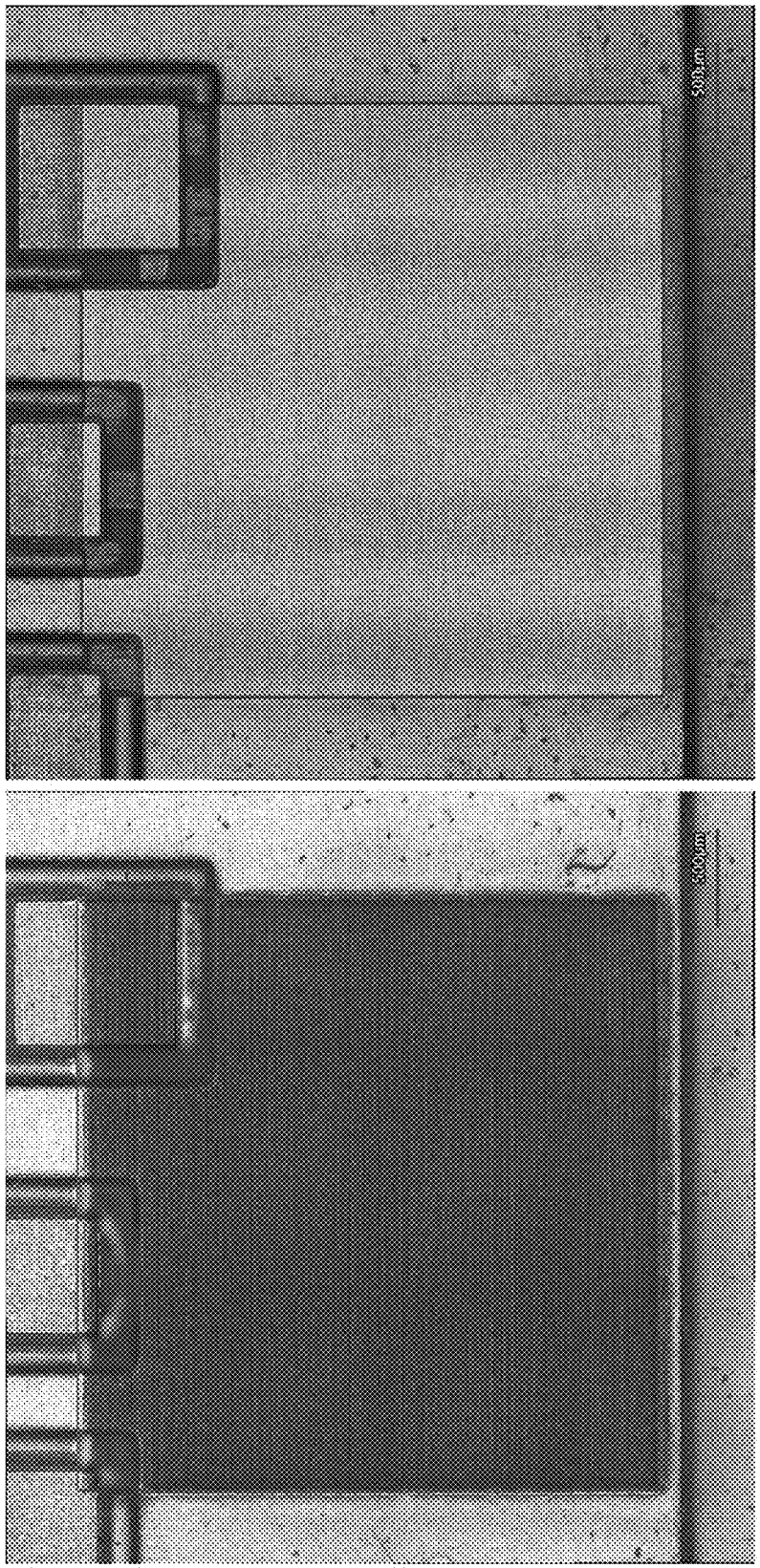

FIG. 11 are images of a copper target that illustrate a trade-off between throughput (e.g., higher laser ablation rate) (left image) and quality (right image) of the process of delayering in a laser optimization experimentation. The use of high power for the laser to create a trench (left image); and the use of low power for the laser and a higher number of cycles to obtain a trench with the same depth (right image).

Figure 12:
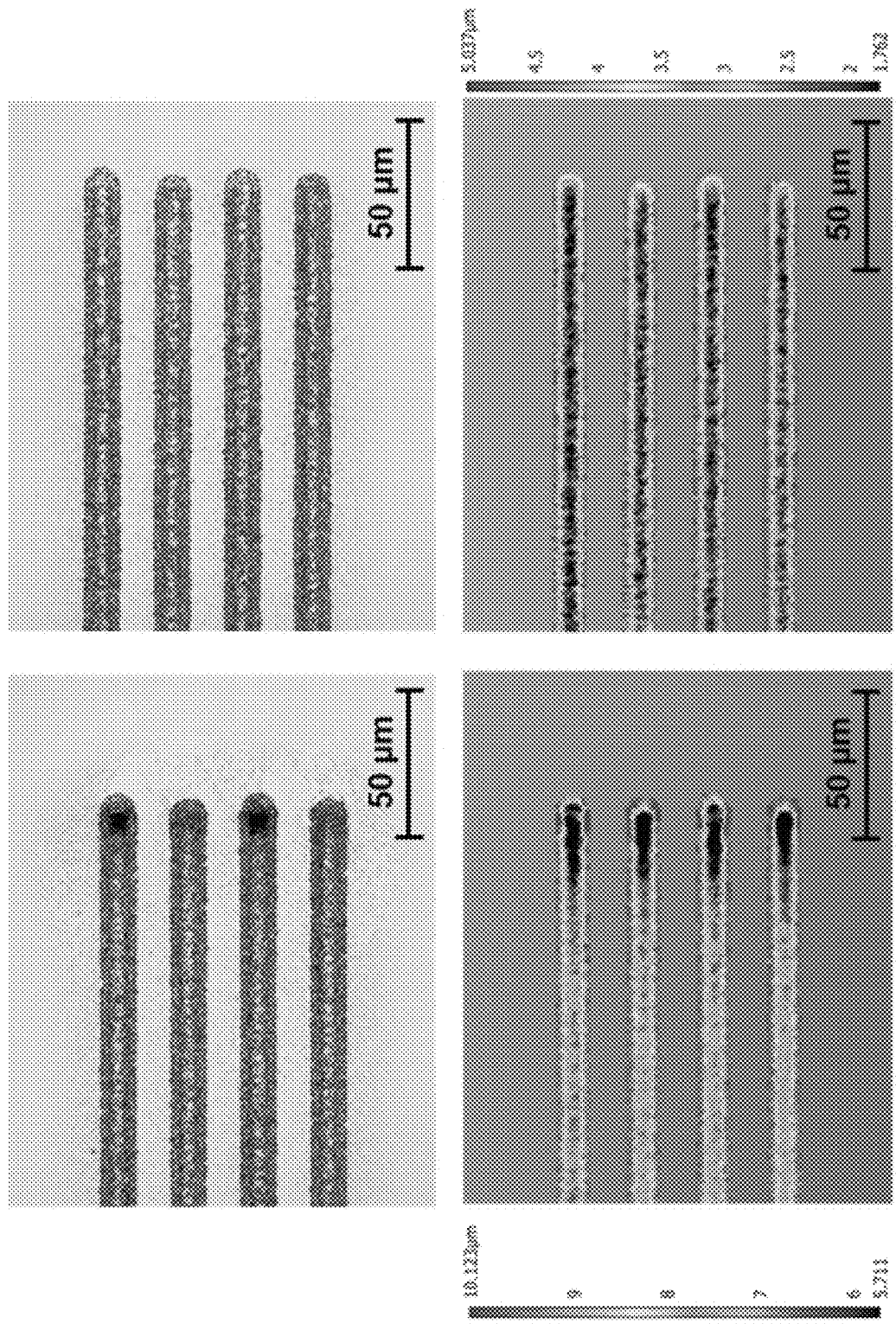

FIG. 12 illustrates images of laser lines drawn on silicon showing the effect of dwelling artifacts. Left image depicts "burn-in" and uneven milling at the edges with no dwelling compensation; right image depicts an image of an example of lasering with dwelling compensation.

Figure 13:
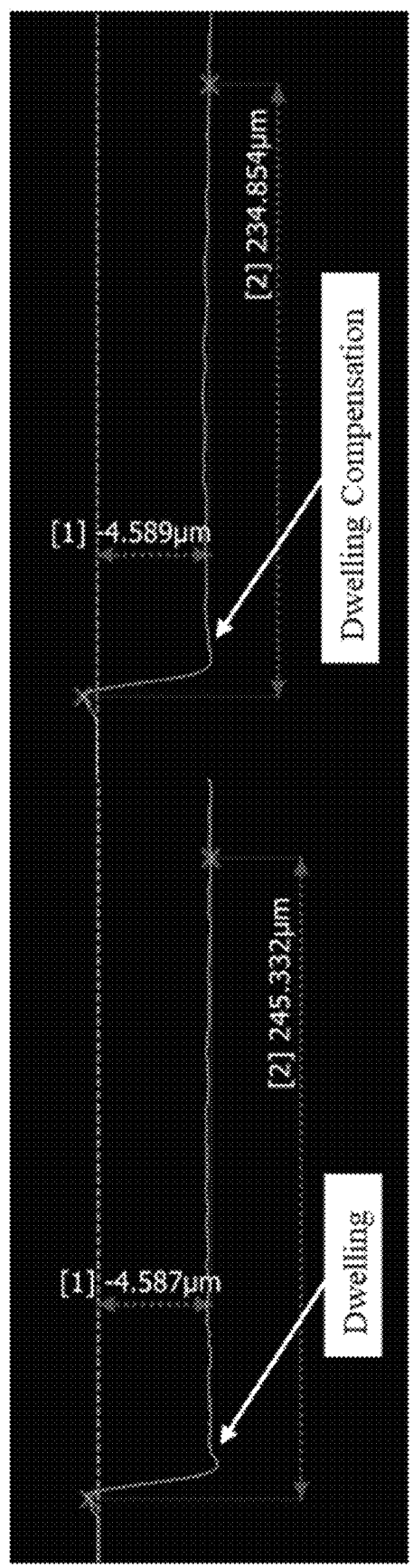

FIG. 13 is a graphical image of an example of a dwelling artifact caused by scanner mirror acceleration (left); and dwelling compensation utilizing a developed intelligent scanning system (right).

Figure 14:
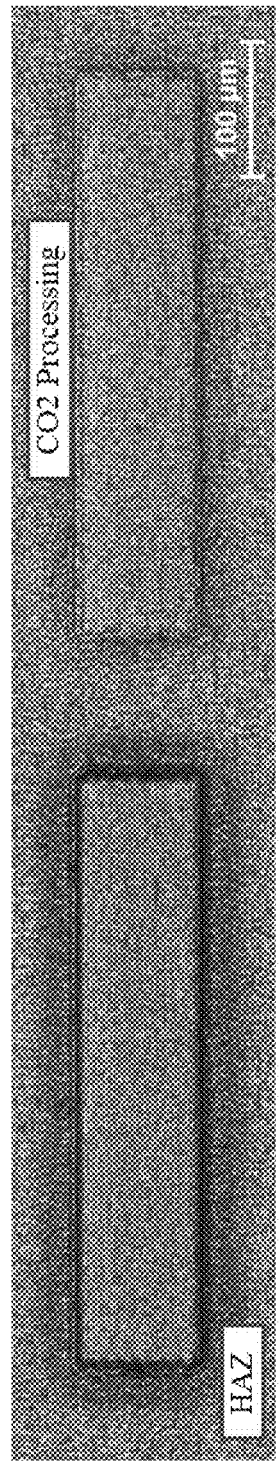

FIG. 14 are images of a copper target showing a comparison of laser processing without gas processing (left); and with gas processing (right).

Figure 15:
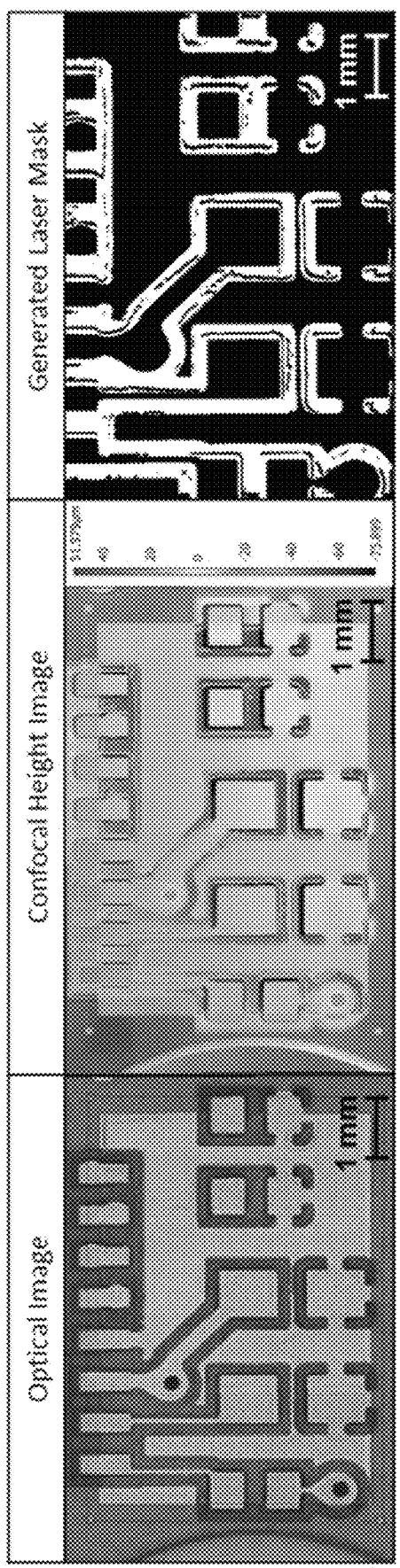

FIG. 15 are images illustrating the generation of a mask for a sample using an optical image and a confocal height image for lasering of the sample.

Figure 16A:
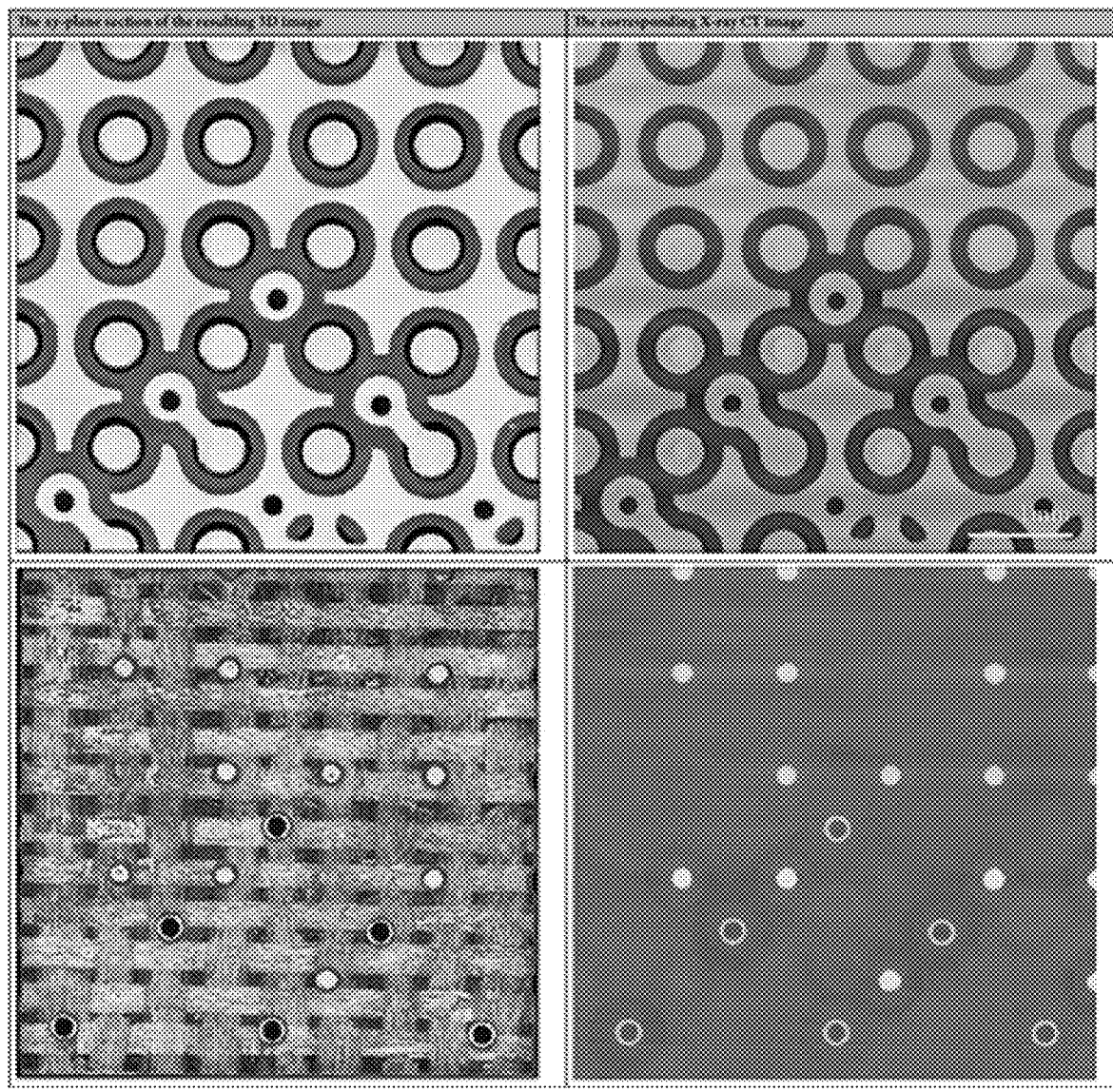

FIG. 16A are images of select xy-plane sections of a PCB sample comparing 3D images using the method disclosed herein and corresponding X-ray CT images of a prior art method.

Figure 16B:
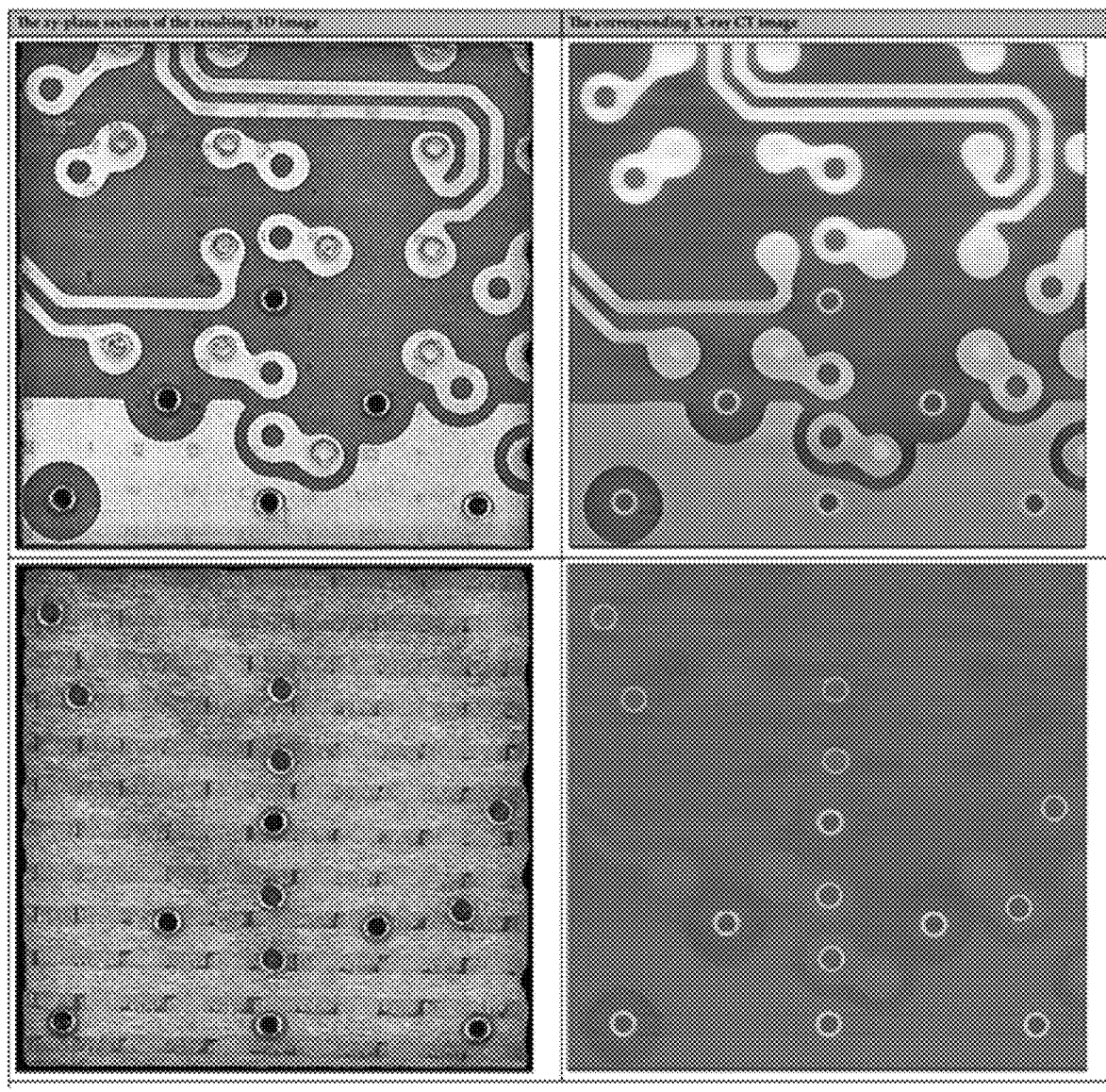

FIG. 16B are images of additional select xy-plane sections of a PCB sample comparing 3D images using the method disclosed herein and corresponding X-ray CT images of a prior art method.

Figure 16C:
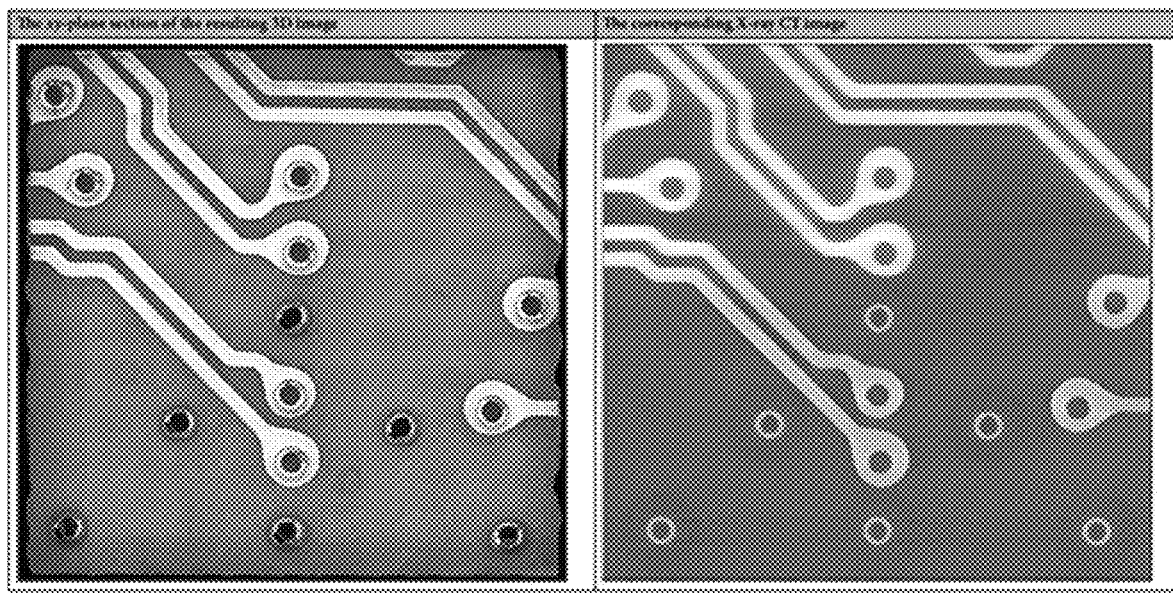

FIG. 16C are images of additional select xy-plane sections of a PCB sample comparing 3D images using the method disclosed herein and corresponding X-ray CT images of a prior art method.

Figure 17:
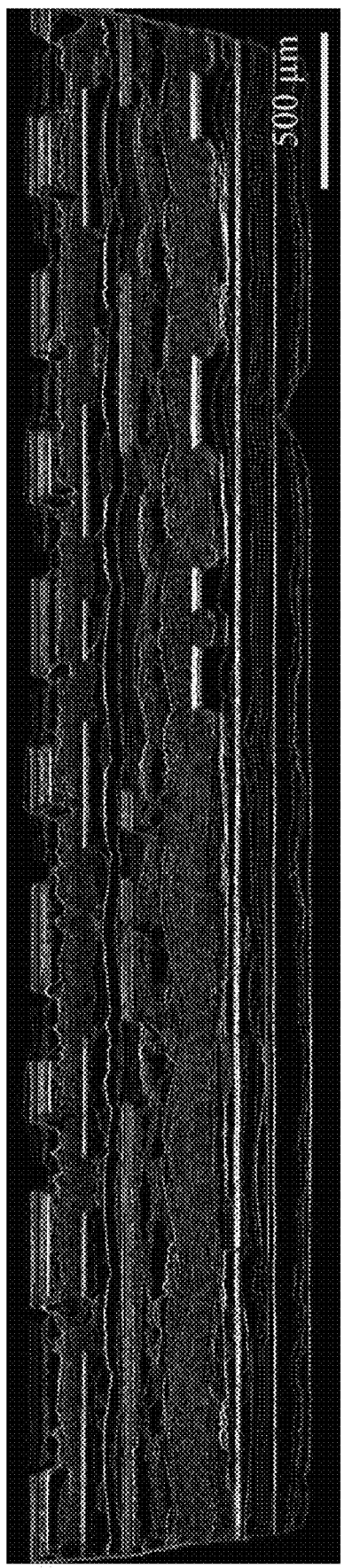

FIG. 17 is an image illustrating a cross-sectional view of volumetric image data of a sample as collected by the confocal microscope at different layers throughout the consecutive delayering then imaging process according to an embodiment of the method disclosed herein. The aspect ratio is 1:1.

Figure 18:
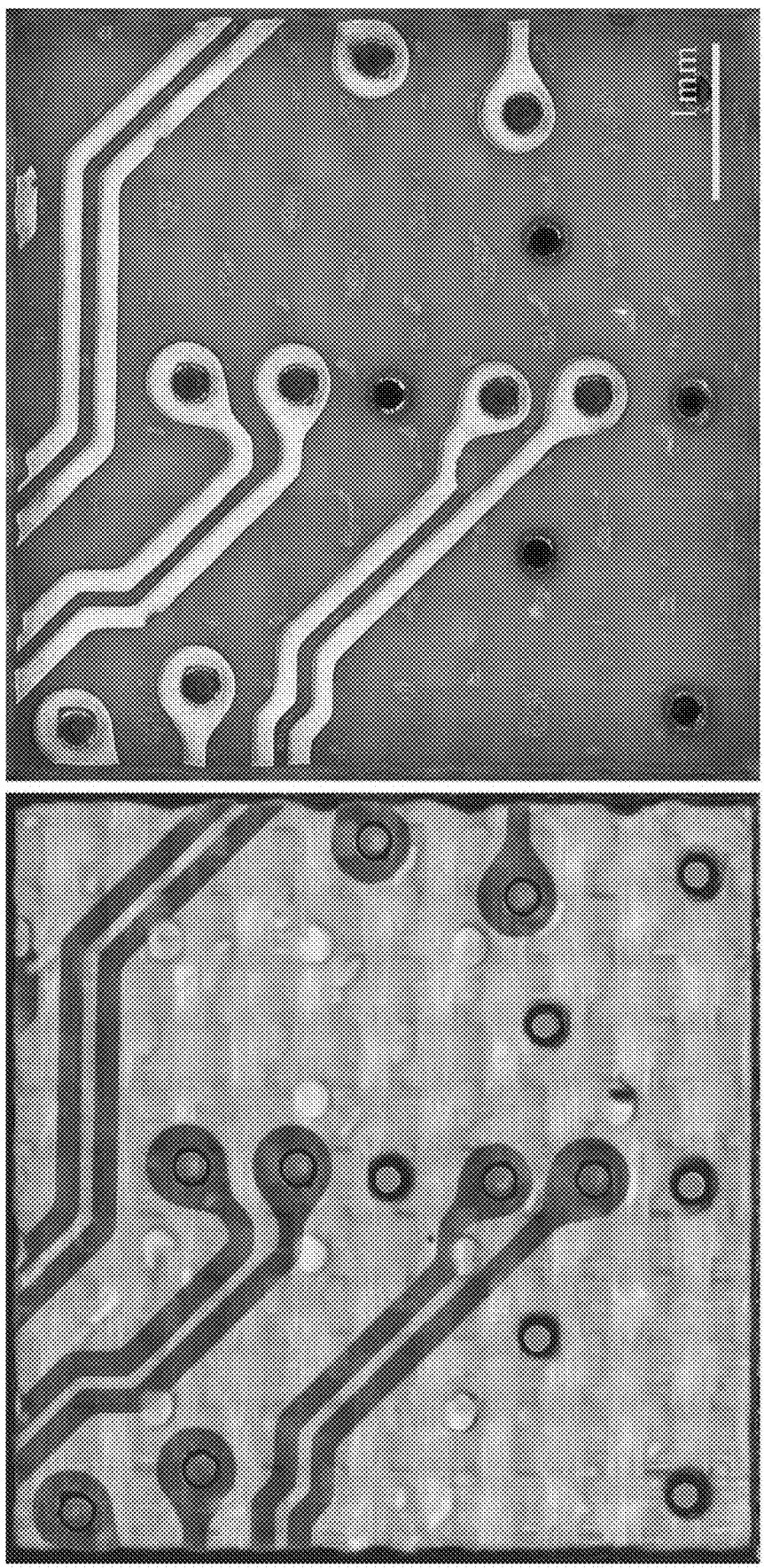

FIG. 18 are images of a PCB sample illustrating application of automated image segmentation using ablation rate information according to an embodiment of the method disclosed herein. Left image illustrates a heat map of the ablation rate (red is low, and yellow is high); right image illustrates the optical image of the same region.

DETAILED DESCRIPTION

The systems and methods described herein provide, among other things, techniques for acquiring high-resolution three-dimensional (3D) images of samples for conducting inspections, failure analysis, and reverse engineering. Samples may include, without limitation, semiconductor devices such as microprocessors, memory, micro-electromechanical systems (MEMS) and other similar components, including, for example, copper substrates, plastics, glass fibers, and the like. The techniques described herein for acquiring images using high-resolution 3D tomography are useful for micro-scale and nano-scale imaging of samples.

The systems and methods disclosed herein use a top-down tomography technique that includes laser ablation techniques and collects surface height information to generate the high-resolution 3D images of a sample. More specifically, in some implementations, the systems and methods use femtosecond laser ablation as a method of delayering the sample in combination with optical and confocal microscopy as the imaging technique for performing rapid 3D imaging. In various implementations, the systems and methods described herein provide a fast and reliable, yet affordable solution for generating high-resolution 3D images of samples.

Generally, "confocal microscopy," most frequently "confocal laser scanning microscopy (CLSM)" or "laser confocal scanning microscopy (LCSM)," is an optical imaging technique for increasing optical resolution and contrast of a micrograph. This is accomplished by using a spatial pinhole to block out-of-focus light during image formation. Capturing multiple two-dimensional images at different depths in a sample enables the reconstruction of three-dimensional structures (a process known as "optical sectioning") within an object. As opposed to conventional microscopy where light travels as far into the sample as the light can penetrate, a confocal microscope only focuses a smaller beam of light at one narrow depth level at a time. The CLSM achieves a controlled and highly limited depth of field. Various types of confocal microscopes are commercially available. These include confocal laser scanning microscopes, spinning disc systems, microlens enhanced versions, and programmable array microscopes. These and other types of confocal microscopes may be used with the teachings herein.

As discussed herein, a "confocal height sensor" generally refers to a measuring system that uses confocal principles for distance and thickness measurements. A variety of such devices are known. One non-limiting example includes "confocalDT IFC2465/66" available from Micro-Epsilon America of Raleigh, North Carolina. Generally, the confocal height sensor provides for high precision displacement and distance measurements on diffuse and reflecting surfaces. Very small objects can be detected due to the small measurement spot size. The axial beam path substantially avoids shadowing effects, enabling measurements even in sleeves and recesses. In some embodiments, geometrical features can be measured inside holes and recesses.

Figure 2A:
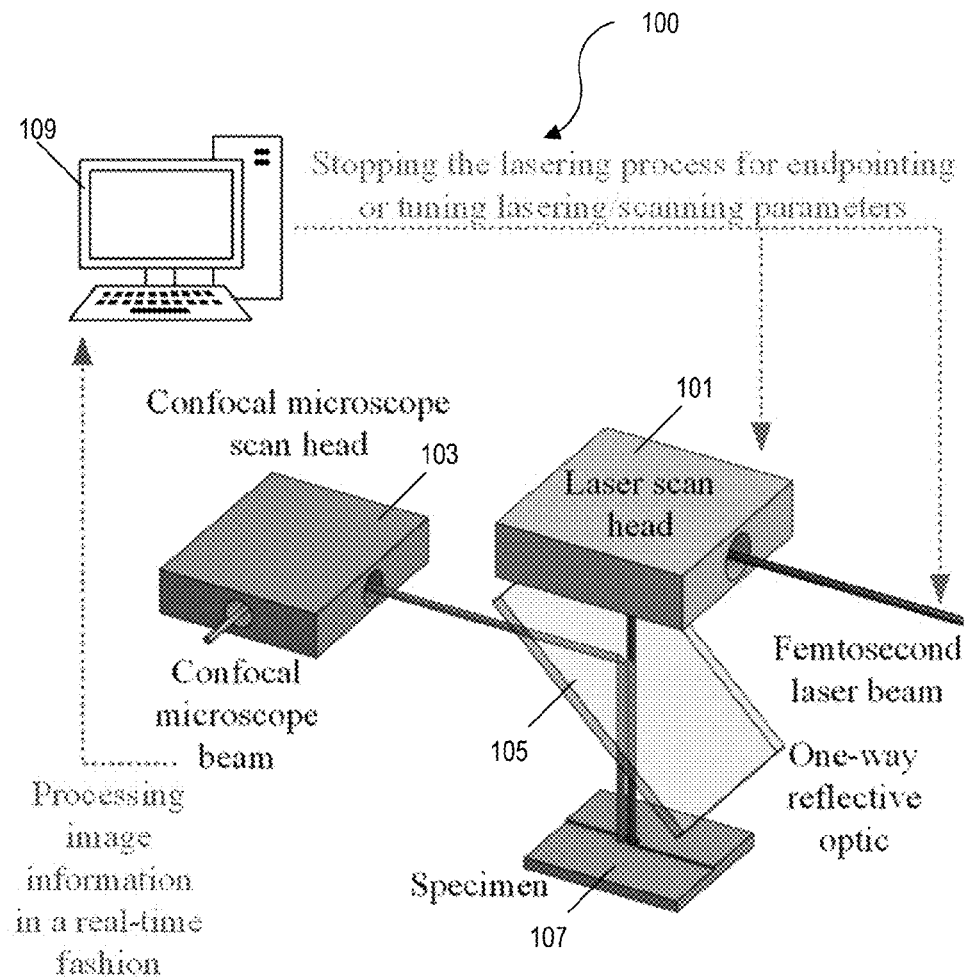
FIG. 2A is a schematic view of aspects of a laser machine system in accordance with one embodiment.
Figure 2B:
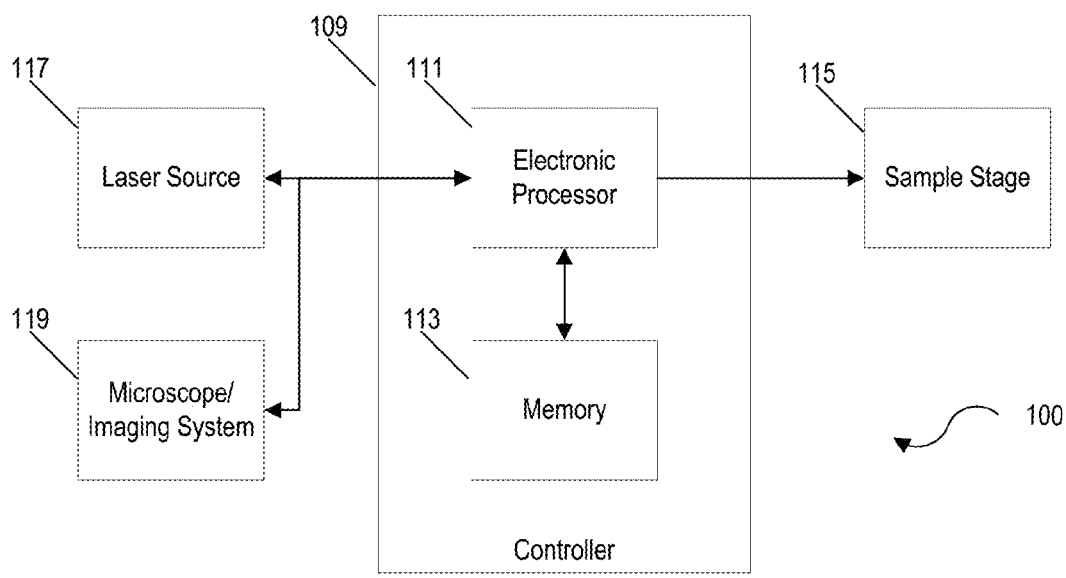
FIG. 2B is a block diagram of an example of a control system of the laser machine system of FIG. 2A.

FIGS. 2A and 2B illustrate an example of a machine system 100 configured to mill or delayer a sample 107 with a laser. The system 100 includes a laser scan head 101 and a microscope scan head 103. The laser scan head 101 receives a femtosecond-pulsed laser beam 102 from a laser source 117 and controllably directs the laser beam 102 towards a surface of the sample 107. The laser scan head 101 is configured to scan the laser beam 102 across the surface of the sample 107 to perform a milling of the sample 107. Light reflected from the surface of the sample 107 during the milling operation is directed by a one-way reflective optic 105 towards the microscope scan head 103. The microscope scan head 103 captures and directs the captured light from the surface of the sample 107 to a microscope imaging system 125 (e.g., confocal microscope, electron microscope, and the like) configured to capture and record image data of the surface of the sample 107. The microscope scan head 103 is configured to move relative to the sample 107 so that the field of view of the microscope imaging system 125 follows the laser beam 102 as the laser scan head 101 moves the projected laser beam 102 across the surface of the sample 107. Examples of these and other components are provided further herein. The foregoing process is controlled by a system controller 109 as shown in FIG. 2B and further described below.

Figure 3A:
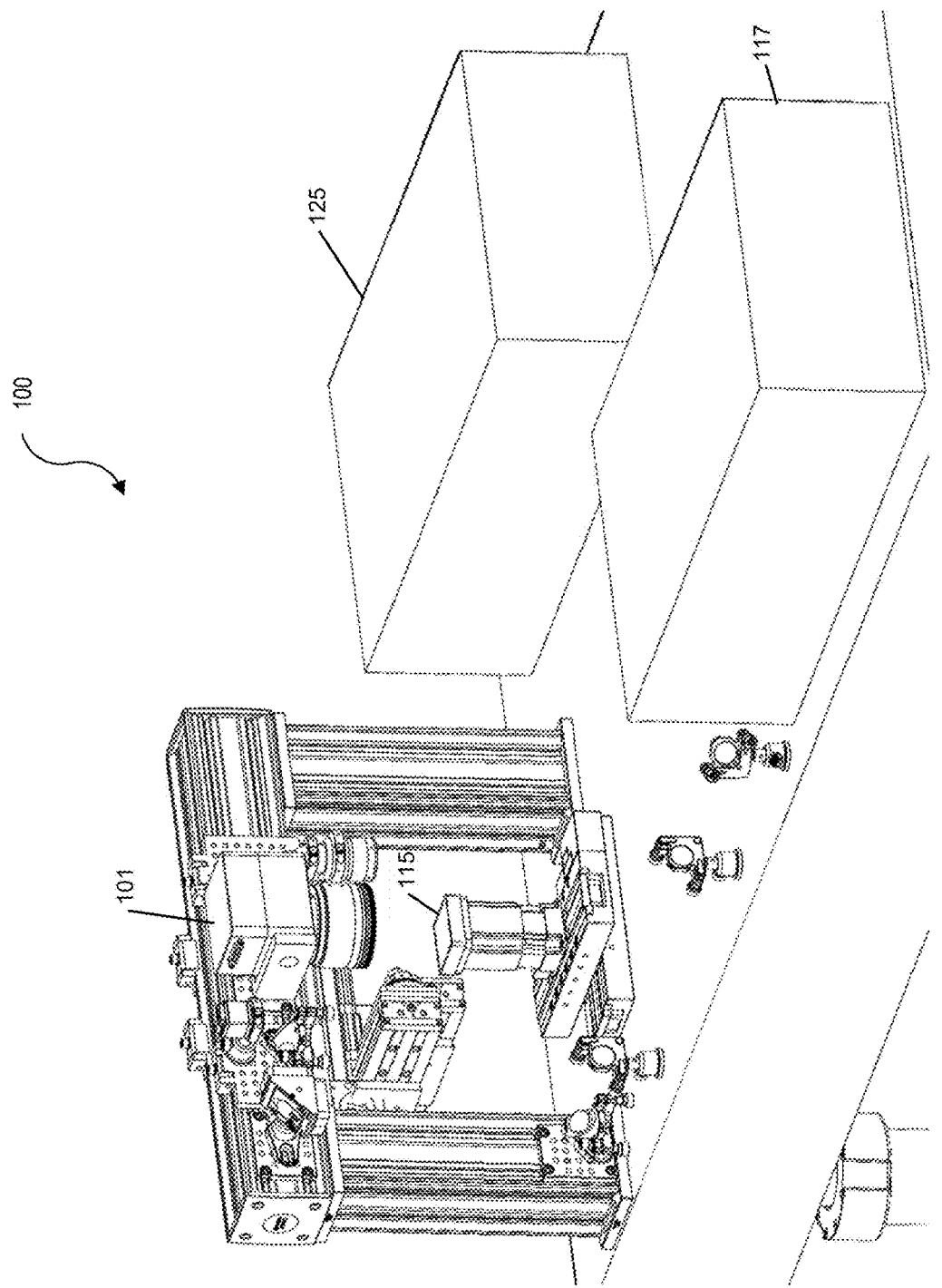
FIG. 3A is a perspective view of a $CO_2$-assisted laser machine system according to one implementation.

FIG. 3A illustrates another example of a machine system 100 configured to mill or delayer a sample 107 with a laser.

Figure 3B:
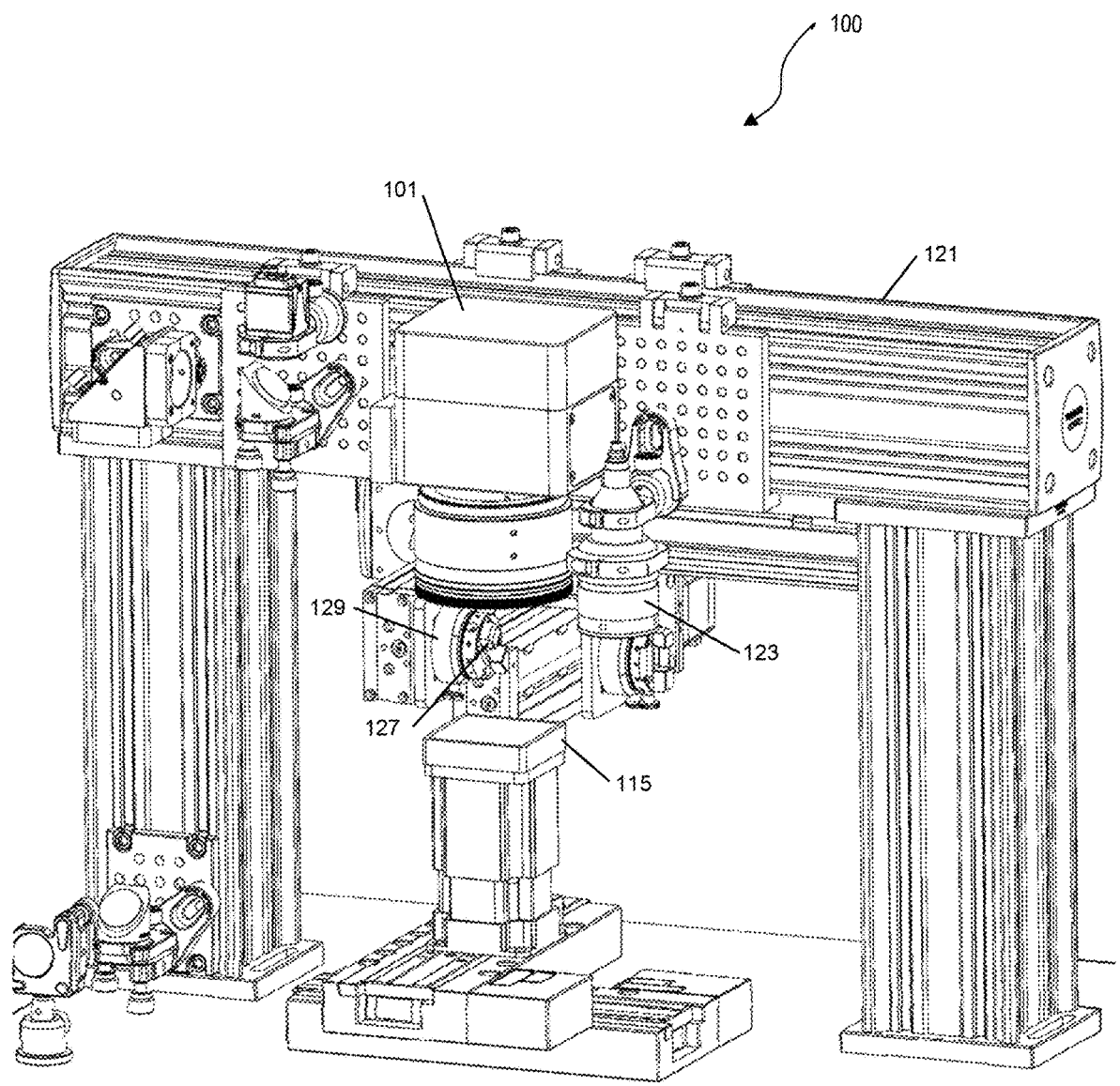
FIG. 3B is an enlarged perspective view of the $CO_2$-assisted laser machine system shown in FIG. 3A.

FIG. 3B illustrates an enlarged portion of the machine system 100 shown in FIG. 3A. In some implementations, the machine system 100 is configured to provide fast, clean, high aspect ratio cross-sectioning of samples, such as, microelectronic parts. The machine system 100 in this example provides high-precision and high-throughput machining for material removal (e.g., for intrusive inspection of electronic components) involving tasks such as sample preparation, delayering, and de-packaging of samples (e.g., micro/nano-scale electronics, components, and the like). The laser source 117 is positioned to emit a controlled laser beam 102 through a sequence of optical devices (e.g., lenses, filters, and/or mirrors) that deliver the laser beam 102 from the laser source 117 to the laser scan head 101. The laser scan head 101 controllably projects the laser beam 102 to a sample 107 (e.g., a microelectronic device IC) positioned on a top surface or platform of a sample stage 115.

In some implementations, the laser source 117 includes a femtosecond pulsed laser. For example, the laser source 117 may include a femtosecond laser system (e.g., a MONACO® femtosecond laser available from Coherent Labs) with 40 W average power, 1035 nm wavelength, and 252 femtosecond pulsed width that can produce a wide range of different pulse repetition rates, from single shots up to 50 MHz. Femtosecond pulsed lasers cause a minimal to zero heat affected zone (HAZ) and, therefore, are well-suited for fine machining of microelectronic parts when throughput is also an important consideration.

With reference to FIG. 3B, the machine system 100 includes the sample stage 115. In one embodiment, the sample stage 115 may be configured as a three degree-of-freedom stage (e.g., a three degree-of-freedom stage available from Zaber Technologies Inc.). A three degree-of-freedom stage has sub-micron translational accuracy for highly precise alignment of the to-be-machined surface with the laser beam 102 and precise focusing/defocusing of the laser beam 102. The sample stage 115 includes a support surface or platform (where the to-be-machined sample is placed) positioned on top of a z-stage pillar. The z-stage pillar is configured to controllably adjust a position of the sample platform in the z-direction (e.g., up, and down). The z-stage pillar is coupled to a y-stage track that includes an actuation mechanism (e.g., an electric motor) for adjusting a position of the z-stage pillar (and the sample positioned thereon) in the y-direction (e.g., back and forth). Finally, the y-stage track is coupled to an x-stage track that also includes an actuation mechanism (e.g., an electric motor) for adjusting a position of the y-stage track, the z-stage pillar, and the sample positioned thereon in the x-direction (e.g., left, and right). Accordingly, the sample stage 115 is configured to adjustably position a sample 107 on the sample platform in the x, y, and z directions and relative to the laser scan head 101 and the microscope imaging system 125.

The sample stage 115 also enables a fixed beam laser ablation scheme and is further synchronized with the laser scan head 101 through the system controller 109 (shown in FIG. 2B and further described in more detail below in reference to FIG. 4). The system controller 109 provides for implementing hybrid machining in which concurrent movement of the sample stage 115 and the laser scan head 101 further increase the scanning rate of the machine system 100. The laser scan head 101 is coupled to a support arm track 121 configured to adjust a position of the laser scan head 101 in the x-direction. The laser scan head 101 also includes one or more controllable mirrors, lenses, and/or other optical devices configured for controllably lasering and focusing the laser beam 102 (from the laser source 117) on the machining plane (i.e., a target plane corresponding to the sample placed on the sample surface of the sample stage 115). In some implementations, the laser scan head 101 includes a galvo scanner and a Q-optic F-θ lens (e.g., a BASICUBE® 10 available from SCANLAB GmbH).

In some implementations, the machine system 100 may also include an acousto-optic modulator (AOM) integrated, for example, into the laser scan head 101 or the laser source 117. The AOM is configured to shutter the laser beam rapidly and controllably for enabling the clean movement of the beam from one location to another without damaging the surface. The AOM is used to start and finish the machining process and to enable jumping from one area of the sample to another. In some implementations, the response time of the AOM is faster than 50 ns.

The machine system 100 also includes a confocal height sensor 123 (e.g., a confocal displacement sensor available from Keyence Corporation) positioned adjacent to (or coupled to) the laser scan head 101 and positioned with a downward facing field of view (e.g., aimed at the sample surface of the sample stage 115 from above). In some implementations, because the confocal height sensor 123 is coupled to the laser scan head 101, the position of the confocal height sensor 123 relative to the laser scan head 101 is known. The confocal height sensor 123 is configured to acquire height data of the surface of the sample positioned on the sample surface of the sample stage 115. This height data is then used as feedback information for tuning the laser machining parameters and positioning the sample 107. More specifically, the height data is used for the adjustment of the height of the sample 107 relative to the laser scan head 101 to ensure in-focus lasering.

The confocal height sensor 123 utilizes laser confocal technology for height measurement where the light emitted from the laser source 117 is concentrated onto the sample surface via the confocal optical system. The concentrated light reflects off the surface of the sample 107 and returns to the photoreceptor through the same light path. In some implementations, a pinhole is placed in the path to the photoreceptor to receive the light and ensures that no light other than what passes through the focal point of the objective lens can reach the photoreceptor.

With continued reference to FIG. 3B, the machine system 100 optionally includes a $CO_2$ nozzle 127 coupled to the support arm track 121 by a nozzle extension arm 129. The nozzle extension arm 129 is configured to controllably adjust a position of the $CO_2$ nozzle 127 in the y-direction by extending and retracting the nozzle extension arm 129. The nozzle extension arm 129 is also configured to controllably adjust a position of the $CO_2$ nozzle 127 in the x-direction by moving the nozzle extension arm 129 along a track of the support arm 121. In some implementations, the $CO_2$ nozzle 127 is configured to deliver a $CO_2$ gas to the machining area by controllable targeting of the $CO_2$ nozzle 127. As described in further detail below, in some implementations, the machine system 100 may be configured to cause the $CO_2$ nozzle 127 to follow the same scan pattern as the laser beam 102. A relatively large spot size of the $CO_2$ nozzle 127 and the corresponding injection system allows for compensating the lower accuracy of the 2D movement system of the $CO_2$ nozzle 127 for achieving higher speeds.

When performing laser machining using a femtosecond laser pulse width, the particle size of material removed from the sample during the machining process can range from nanometer-scale to small micrometer-scale. This removed material in many cases redeposits itself onto the surface of the sample. This redeposition can then interfere with future processing of the sample and can cause many complications including, for example, slowed rate of material removal, limits in depth due to the aspect ratio of the processed area, and difficulty in developing optimized laser and scanning parameters used in the process. In some implementations, air guns (e.g., a nozzle emitting pressurized air) can be used to blow the debris from the surface. However, air guns require particle drag to remove the redeposited particles and, if the size of the particle is less than approximately 5 microns, there is not enough drag force to remove this particle from the surface.

Accordingly, in some implementations, a $CO_2$ delivery system associated with the $CO_2$ nozzle 127 is configured to convert $CO_2$ gas to three phases to benefit from unique features of each phase. $CO_2$ applied to the sample in the liquid phase eliminates hydrocarbon as it is a good solvent. $CO_2$ applied to the sample in the gas phase can be used to blow debris from the surfaces of the sample. And, $CO_2$ in the solid phase (i.e., $CO_2$ "snow") can be controllably applied to the sample surface to remove particle debris generated by the laser machining process that are connected to the sample surfaces by Van der Waal forces. Accordingly, the use of the $CO_2$ delivery system in tandem with the laser processing in the machine system 100 of FIG. 3B provides: (1) enhanced wall quality in the machined cross-sections, (2) improved surface quality in terms of surface roughness, (3) enhanced machined depth, (4) reduced collateral damage (e.g., a reduced or eliminated HAZ), and (5) substantially less permanent (e.g., Van der Waal-bonded) debris/particulates.

Figure 4:
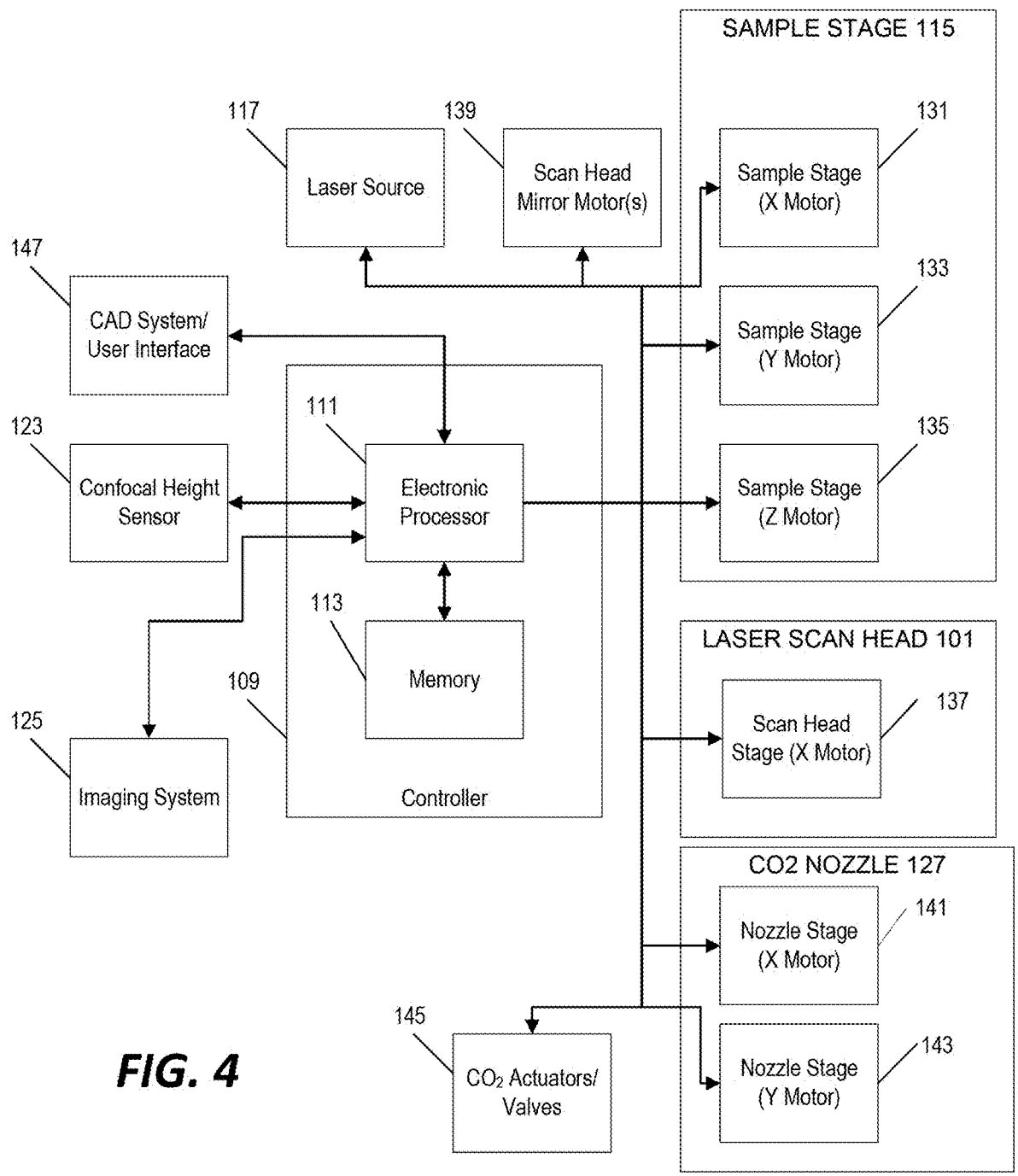
FIG. 4 is a block diagram of a control system for the $CO_2$-assisted laser machine system of FIGS. 3A and 3B.

FIG. 4 illustrates a more detailed example of the system controller 109 illustrated in FIG. 2B. The system controller 109 includes an electronic processor 111 and a non-transitory computer-readable memory 113. The memory 113 stores data and computer-executable instructions that are accessed and executed by the electronic processor 111 to provide the functionality of the system controller 109 (including, for example, the functionality described herein). The system controller 109 is communicatively coupled to the sample stage 115 having a plurality of movement stages with one or more motors and is configured to generate and transmit control signals to the movement stages to control movement of the sample 107 relative to the confocal microscope scan head 103 and the laser scan head 101. The system controller 109 is also communicatively coupled to the laser source 117 and is configured to generate and transmit control signals to the laser source 117 to define and adjust parameters of the laser beam emitted by the laser source 117. Similarly, the system controller 109 is communicatively coupled to the microscope imaging system 125 and is configured to receive image data of the surface of the sample 107 from the microscope imaging system 125.

The system controller 109 is communicatively coupled to a plurality of electric motors that facilitate the controlled movement of the sample stage 115, the laser scan head 101, and the $CO_2$ nozzle 127. For example, the system controller 109 generates and transmits control signals to an x-motor 131, a y-motor 133, and a z-motor 135 of the sample stage 115 to control positioning of the sample 107 positioned on the sample surface of the sample stage 115 in 3D space. The system controller 109 also generates and transmits control signals to an x-stage motor 137 for the laser scan head 101 to controllably adjust a position of the laser scan head 101 in the x-direction and to one or more additional electric motors 139 that control the positioning/orientation of the mirror(s) of the laser scan head 101 for controllably scanning the laser beam 102 on the surface of the sample 107. Finally, the system controller 109 generates and transmits control signals to an x-motor 141 and a y-motor 143 of the nozzle extension arm 129 to control positioning of the $CO_2$ nozzle 127 in a two-dimensional plane above the sample stage 115.

In this way, the system controller 109 can controllably synchronize movement of the $CO_2$ nozzle 127 and the projected laser beam relative to the sample 107 to cause the $CO_2$ nozzle 127 to emit $CO_2$ along the same path as the laser machining. The system controller 109 is also communicatively coupled to the laser source 117 and the actuators/valves 145 of the $CO_2$ system. The system controller 109 is configured to generate and transmit control signals to regulate the laser beam 102 and the $CO_2$ applied to the sample 107. Accordingly, the system controller 109 is configured to controllably synchronize the location of the laser spot on the surface of the sample 107 in tandem with the $CO_2$ jet spot and applies an appropriate time delay between the two to avoid interaction of the laser beam 102 with the $CO_2$ spot. In some implementations, the system controller 109 is also configured to generate and transmit control signals to the laser source 117 to cause the laser source 117 to adjust various parameters of the laser beam 102 (e.g., on/off, frequency, power/amplitude, pulse width) and to generate and transmit control signals to the actuators and valves 145 of the $CO_2$ system to controllably adjust various parameters of the emitted $CO_2$ (e.g., on/off, pressure of $CO_2$ jet, state of $CO_2$ jet, etc.). The system controller 109 is also communicatively coupled to the confocal height sensor 123 and configured to receive a signal output from the confocal height sensor 123. The signal output from the confocal height sensor 123 is indicative of one or more surface heights of the sample 107 relative to a coordinate frame used by the machine system 100. The controller 109 can utilize the height data from the confocal height sensor 123 to adjust the operation of the machine system 100 (e.g., by raising/lowering the platform of the sample stage 115 and adjusting an angle of the laser scan head 101, etc.).

The system controller 109 is also communicatively coupled to microscope imaging system 125 and configured to receive a signal output from the microscope imaging system 125 indicative of a two-dimensional image of a surface of the sample 107. The microscope imaging system 125 may comprise a confocal microscope, an electron microscope, or an ion microscope. The system controller 109 is configured to receive a 2D image of a first surface of the sample 107 from the microscope imaging system and a 2D height map of the first surface of the sample 107 from the microscope imaging system. The system controller 109 is configured to process the two images from the microscope imaging system 125 to generate a 3D surface image of the first surface of the sample 107.

Figure 5A:
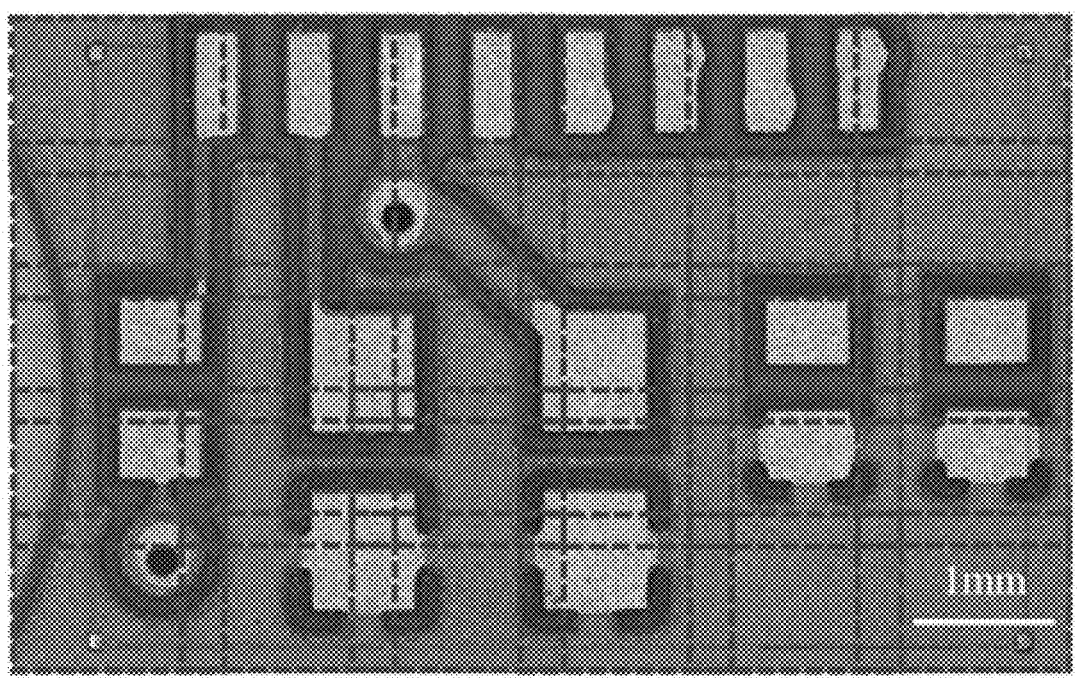
FIG. 5A illustrates a 2D optical image of a sample with 6×5 imaging grid acquired with the digital microscope.
Figure 5B:
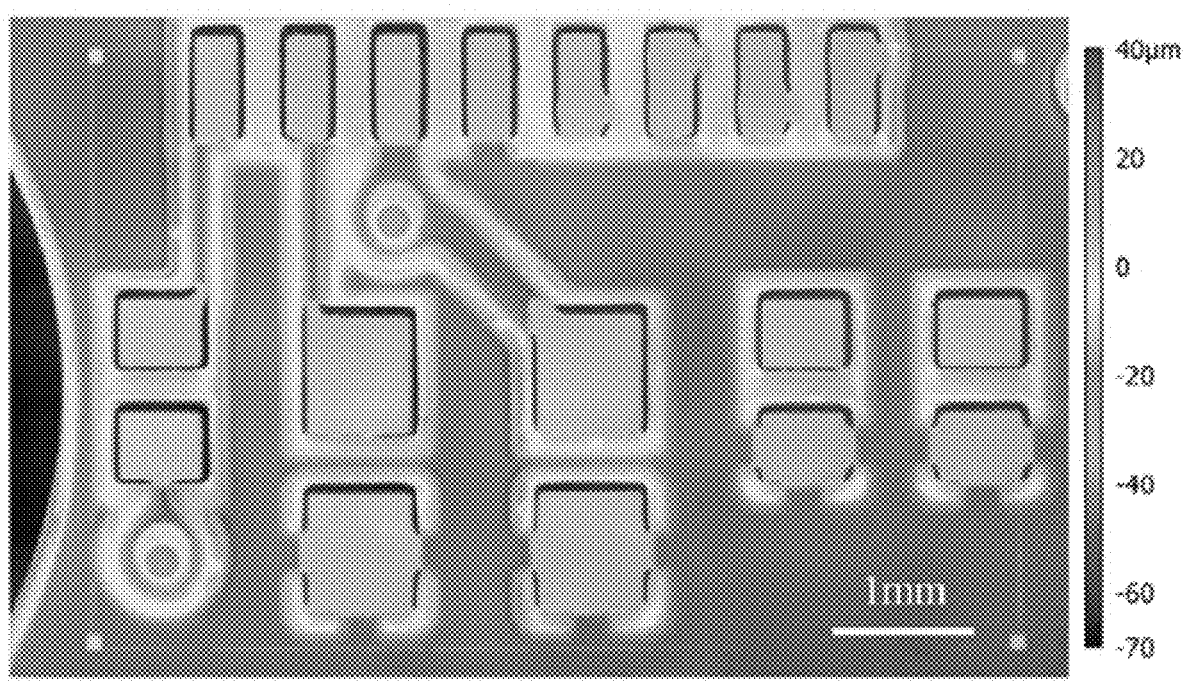
FIG. 5B illustrates surface height information of the same area of the sample shown in FIG. 5A acquired with a confocal height sensor.
Figure 5C:
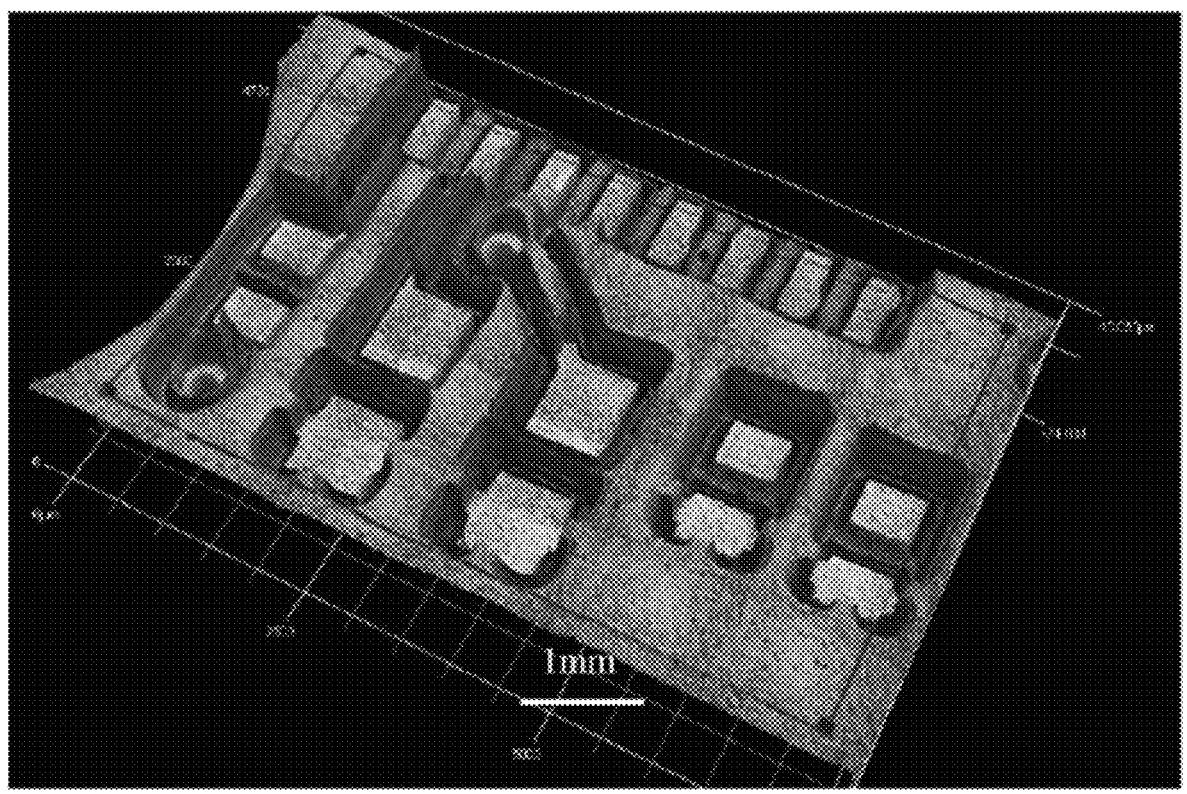
FIG. 5C illustrates a 3D image of the same area of the sample shown in FIGS. 5A and 5B generated with a method according to an embodiment of the disclosure.

In one example where the microscope imaging system 125 is a confocal microscope, the system controller 109 is configured to receive a 2D optical image (FIG. 5A) from the confocal microscope/microscope imaging system 125 and a confocal image (FIG. 5B) from the confocal microscope/microscope imaging system 125 showing surface height information (e.g., a 2D surface height map) of the same imaged area as in FIG. 5A. The system controller 109 is configured to process the two images from the confocal microscope/microscope imaging system 125 to generate a 3D surface image as depicted in FIG. 5C. In some implementations, the system controller 109 is configured to overlay the optical image acquired by the confocal microscope/microscope imaging system 125 onto the confocal height image acquired by the confocal microscope/microscope imaging system 125 for each layer of the sample 107 to generate the 3D image of the surface. In some implementations, the RGB information from the 2D optical image acquired by the confocal microscope/microscope imaging system 125 is combined with the 2D height information from the confocal image acquired by the confocal microscope/microscope imaging system 125 to generate a 3D image for each surface of the sample. The resulting compound image, for each surface, is registered in a universal coordinate system. Fiducial marks (discussed below) created on the sample 107 aid in establishing the universal coordinate system, by correcting for translation, rotation, and tilting of the sample 107 that occurs across different images. A mask (discussed below) is generated, based on the 2D height map, that prescribes the upcoming lasering pattern for the surface of the sample 107. A mask is generated for each lasering step.

Each laser step removes all or a portion of the sample to expose a new surface of the sample. The new surface may be referred to herein as a first surface, a second surface, a third surface, etc. where the first surface, the second surface, and the third surface are different. For example, the first surface may be a top surface of the sample prior to any lasering steps being conducted. As another example, the second surface is the exposed surface of the sample after a first lasering step is conducted on the sample. As a further example, the third surface is the exposed surface of the sample after a second lasering step is conducted on the sample.

The system controller 109 is also communicatively coupled to a user interface 147 including a display device and one or more user input devices (e.g., a keyboard, mouse, etc.). The user interface 147 is configured to receive various operating instructions and parameters from a user. In some implementations, the user interface 147 includes a computer-assisted design system that is configured to receive inputs from a user defining parameters of the machining to be performed by the machine system 100 (e.g., position, size, pattern, depth, etc.). In some implementations, the user interface 147 is also configured to receive user instructions defining the state of matter of the $CO_2$ to be used during the machining process. In some implementations, the user interface 147 allows the user to define different states of matter for the $CO_2$ to be used at different stages of the machining process (e.g., the machining process can be user-defined to emit $CO_2$ in gas form to "blow" debris at one step and to emit solid $CO_2$ snow at another step to remove debris attracted to the sample by, for example Van der Waals force).

Figure 1:
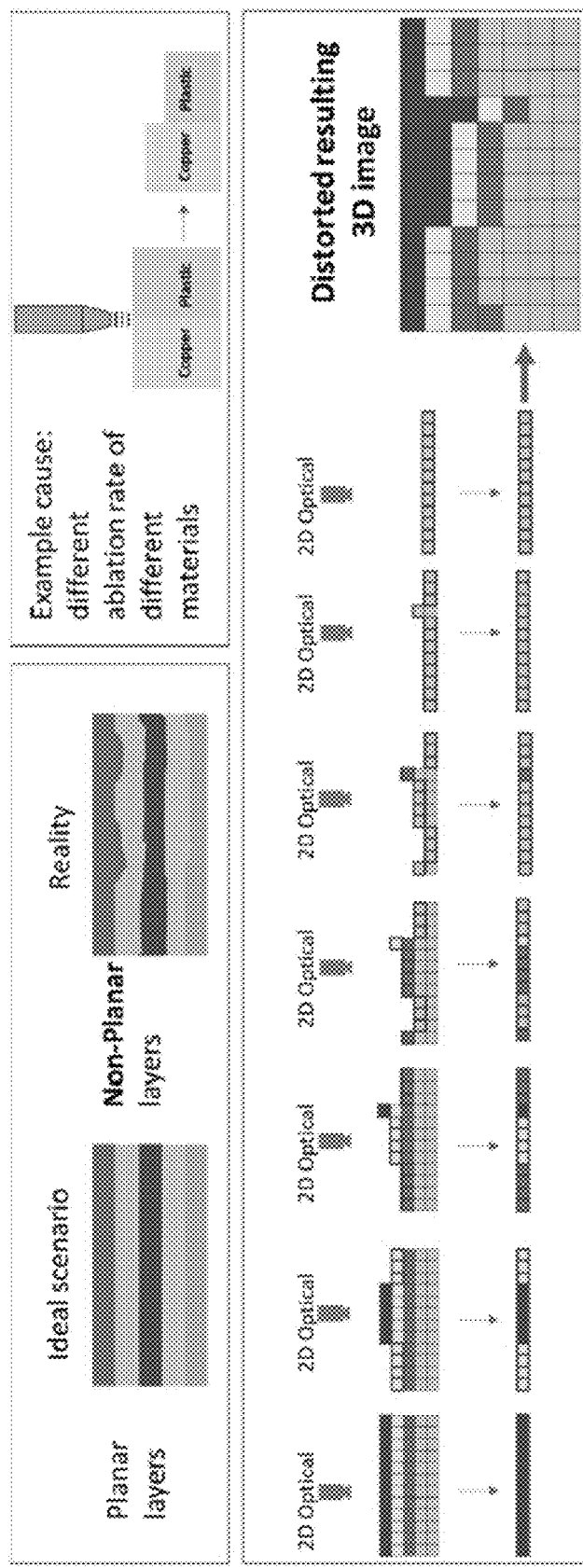
FIG. 1 is a schematic diagram that illustrates a distortion of a 3D image caused by nonplanarity of 2D layers of a conventional (prior art) approach.

As described above, FIG. 1 illustrates one of the main challenges associated with the conventional approach for acquiring a 3D image of a sample from the images of the exposed layers. A key assumption of the conventional approach, as described above, is that the exposed layers are flat and thus the 3D information about each point can be obtained from the corresponding 2D image and knowledge of the layer thickness. However, if the exposed layers deviate from being flat, the use of this approach results in a distorted 3D image as shown in FIG. 1 which introduces difficulties and inaccuracies in the follow-up analysis efforts.

Figure 6A:
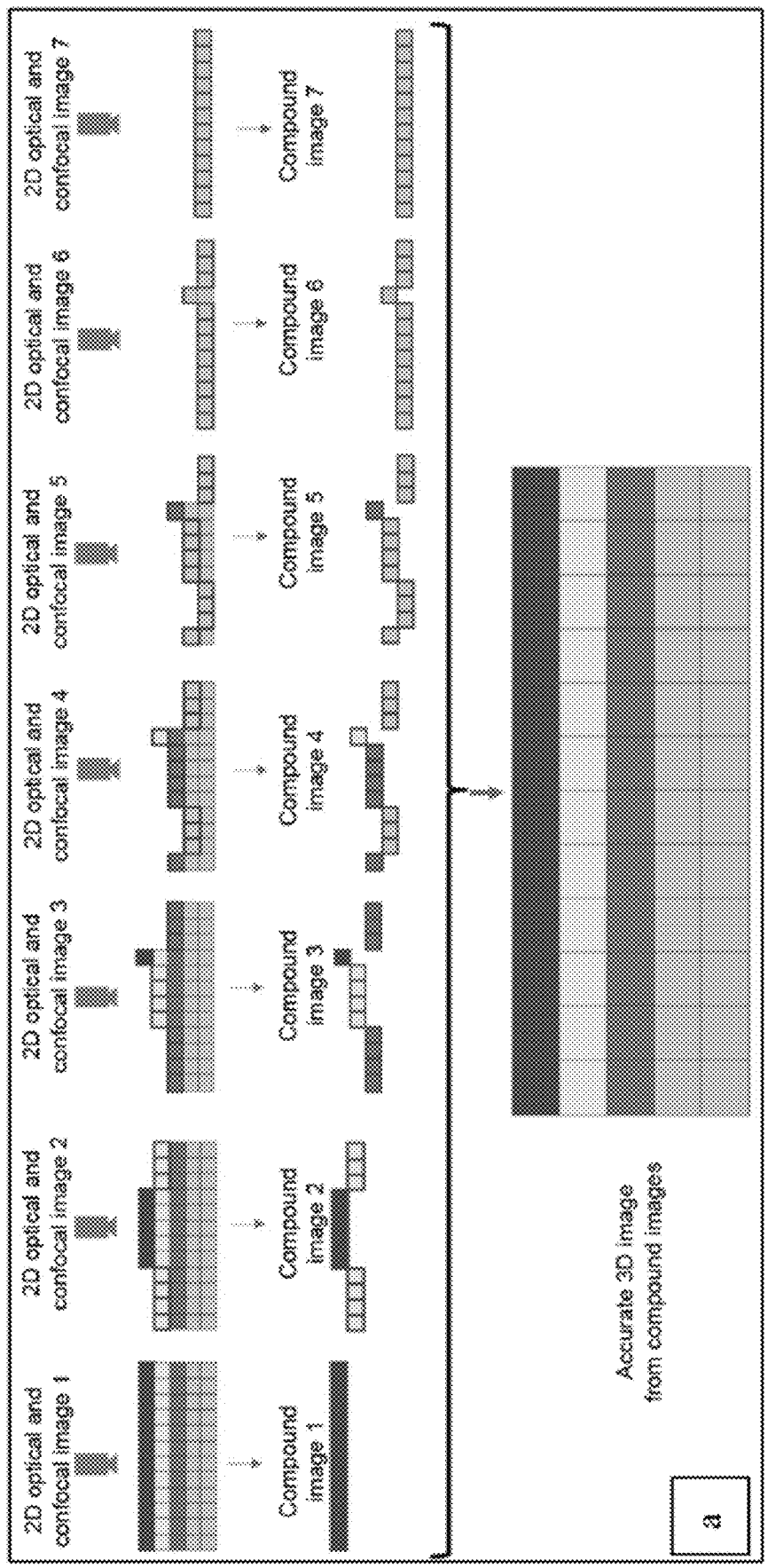
FIG. 6A illustrates an approach for sampling a volume of interest to address the distortion of the 3D image shown in FIG. 1.
Figure 6B:
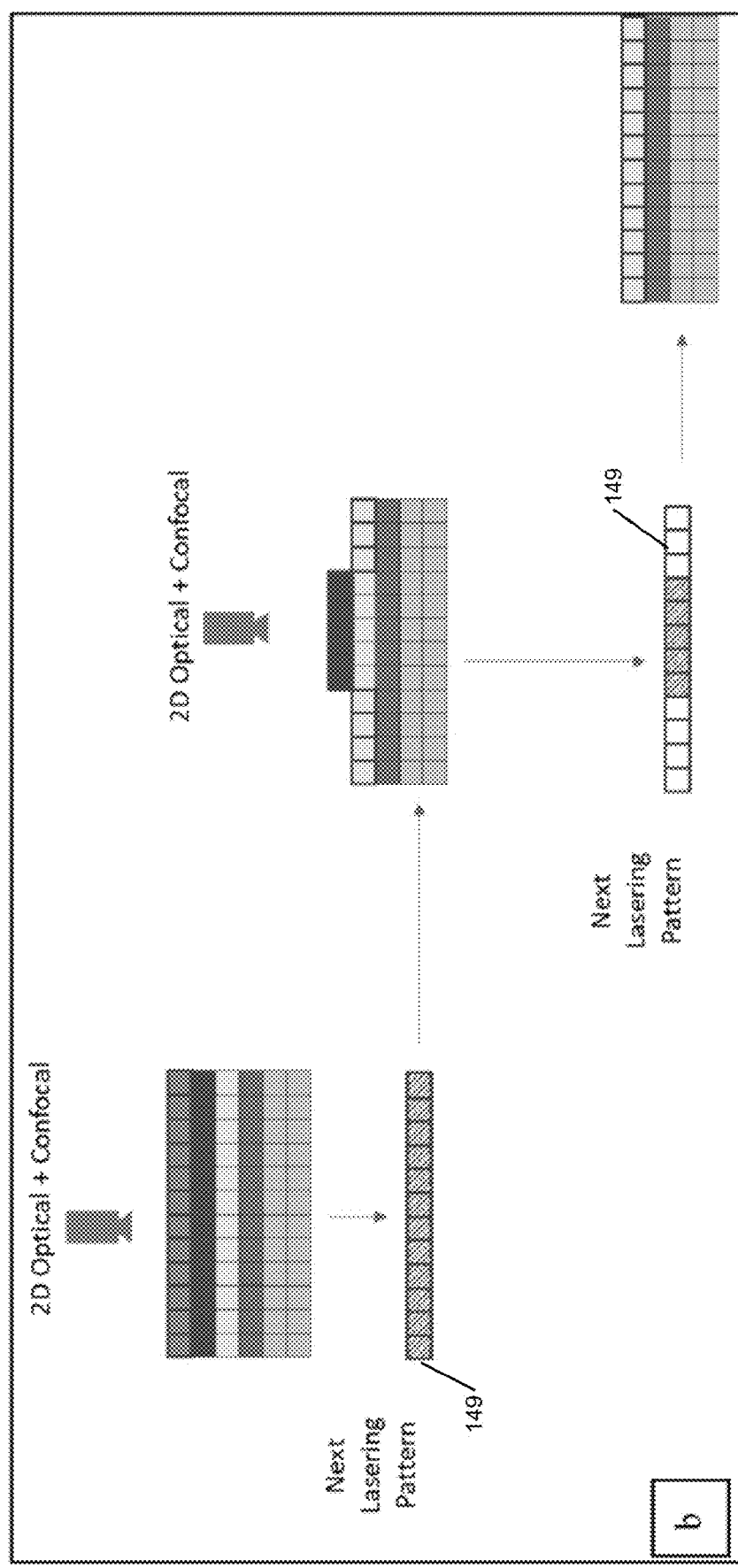
FIG. 6B illustrates a laser cutting pattern determined based on a height profile to maintain a height variation within a certain limit.

Accordingly, the machine system 100 illustrated in FIGS. 3A and 3B address the challenges of the conventional approach by conducting consecutive imaging and laser delayering steps on a sample 107. This novel approach is schematically illustrated in FIGS. 6A and 6B. The approach is defined to include several steps that are repeated for each exposed surface of the sample 107. By way of example, for each exposed surface, first, a 2D image and a 2D height map of a region of interest of the sample 107 are acquired. Based on the measured height at the region of interest, the system controller 109 determines whether that region of interest must undergo lasering. Then, the laser conducts delayering of the sample at the required region(s) of interest. A 3D volumetric image of the sample is constructed from the 2D optical image and the 2D confocal image obtained at the first step of each exposed surface (FIG. 6A, first row). With reference to FIG. 6A, at each point on the 2D xy plane, the pixel color from the 2D image is combined with the height information of that point (in the z direction) obtained from the height map. A combination of the 2D image and the 2D height map results in the compound image of the surface (FIG. 6A, second row). The compound image of the surface is registered in a universal coordinate system and is embedded in the 3D image (FIG. 6A, third row). The above steps are repeated for the next surface of the sample 107 to generate the 3D image of the sample 107.

Figure 7:
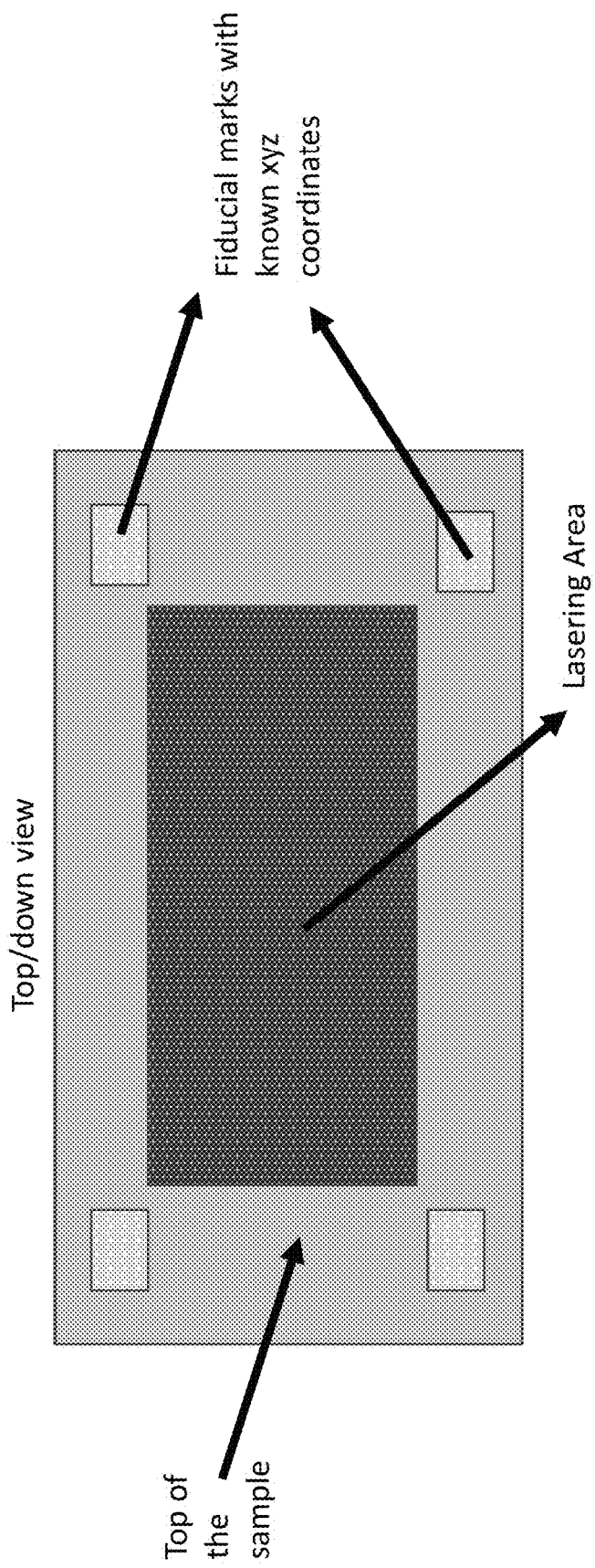
FIG. 7 schematically illustrates various areas of a region of interest of a sample for use in a universal coordinate system.

A set of fiducial marks (shown in FIG. 7) created on the sample at the beginning of the process (i.e., before step #1 of the first layer described above) aids in establishing and using a universal coordinate system. The centers of four square-shaped fiducial marks carved outside the region of interest of the sample serve as anchor points for translation, rotation, and tilting correction that may occur across images of different surfaces.

As illustrated in FIG. 6B, in each surface, based on the 2D height map of the region of interest, a mask 149 is generated that prescribes the next laser cutting pattern. Only areas with heights (as indicated by the height map) larger than a certain threshold are lasered in the next lasering step. Since the ablation rate is not the same in different areas of the region of interest due to the presence of different materials, it is necessary to keep the surface height variation within a certain limit to allow the microscope imaging system 125 to capture the entire region of interest. The confocal height sensor 123 obtains information at different height increments to acquire the height profile of the region of interest for the surface. The number of such increments, and thus the imaging time, is directly proportional to the height range of the region of interest, for a certain desired height resolution. The use of masks shortens this imaging time.

Figure 6C:
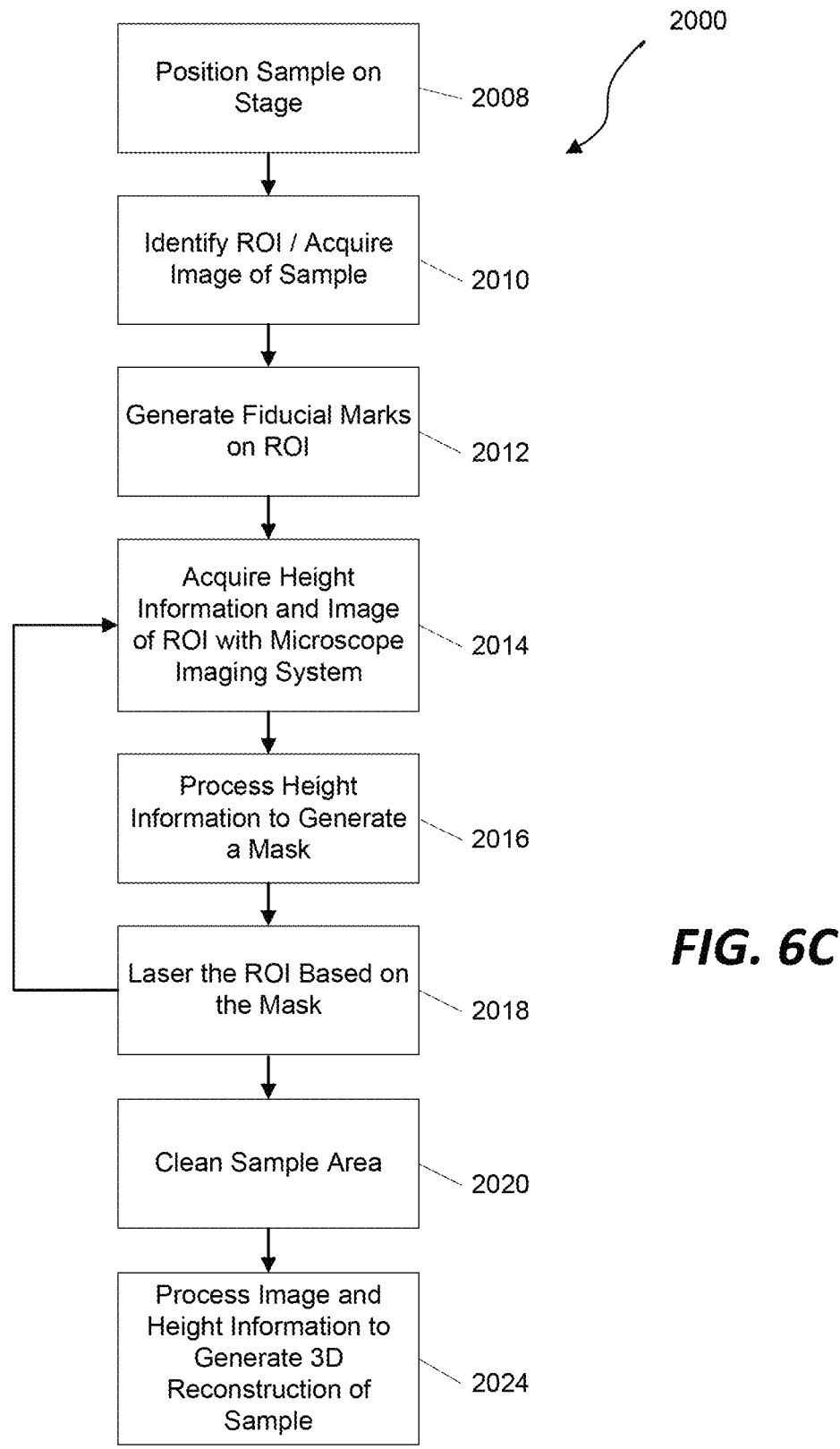
FIG. 6C is a block diagram of a control system for the $CO_2$-assisted laser machine system of FIGS. 3A and 3B.

FIG. 6C illustrates a method 2000 of generating a 3D image of a sample from non-flat 2D surface images according to an embodiment of the present disclosure. The method 2000 provides for repetition of conducting consecutive imaging and laser delayering steps with the machine system 100. First, at step 2008, the sample 107 is positioned on a surface or platform of the stage 115. At step 2010, a region of interest (ROI) of the sample is identified for lasering, and optionally, an overview X-ray CT image of the sample 107 is obtained for preliminary identification of the expected number of layers and the thickness of the layers.

At step 2012, a plurality of fiducial marks (e.g., four 100 μm×100 μm) are created outside of the ROI of the sample 107 using the laser. The fiducial marks are used for (1) high precision alignment of the lasering pattern across different repeated steps, and (2) high precision registration of surface images for reconstructing a 3D image of the ROI of the sample 107.

At step 2014, the sample 107 is moved to obtain a 2D image of the ROI and 2D height information (e.g., a height map) of the ROI and the fiducial marks for the surface of the sample using the microscope imaging system 125.

At step 2016, the obtained 2D height information is processed by the system controller 109 to produce a mask 149 that is used to perform the lasering step on the sample 107. The 2D height map(s) are processed by (a) identifying the fiducial marks based on thresholding on the depth (height); (b) correcting the image for rotation and translation by utilizing the centers of the fiducial marks; (c) analyzing a small intact area outside (above or below) each fiducial mark to level the height map; and (d) generating the lasering mask 149 based on the height map of the ROI. The lasering mask 149 determines which regions of the sample must be lasered and which regions must remain intact for the next lasering step.

In step 2018, the mask 149 is utilized to laser the ROI of the sample 107 to expose the next surface of the sample 107. In step 2020, after the lasering is complete, the area is optionally cleaned with the $CO_2$ nozzle 127.

In one implementation, steps 2014, 2016, and 2018 are repeated for each surface of the sample until the desired volume of the sample 107 is fully captured. In another implementation, steps 2014, 2016, 2018, and 2020 are repeated for each surface of the sample 107 until the desired volume of the sample 107 is fully captured. After a plurality of 2D optical images are obtained, the machine controller 109 or other computer processor processes at step 2024 the acquired 2D images and 2D height information to form a 3D reconstruction of the sample 107.

Example—Generating a 3D Image of a Printed Circuit Board

In this example, femtosecond laser ablation is applied on a printed circuit board (PCB), and the results are validated and compared with the X-ray CT image of the PCB sample.

Figure 8A:
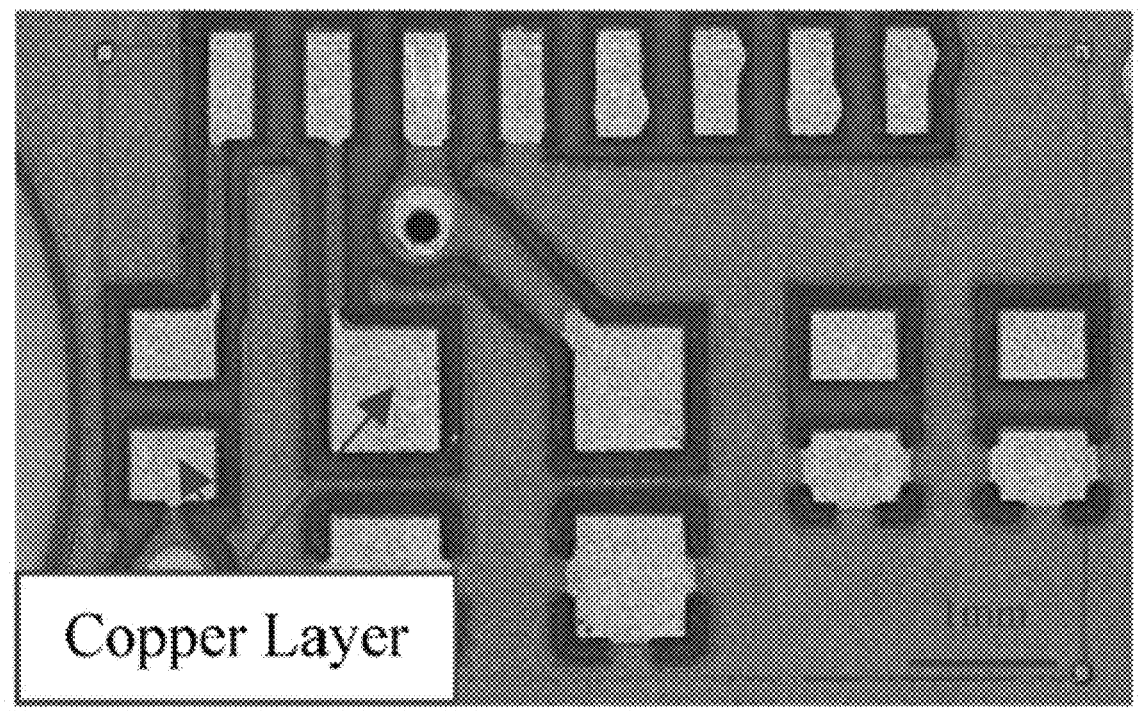
FIG. 8A illustrates a digital image of a PCB sample board after 0 cycles of laser ablation.
Figure 8B:
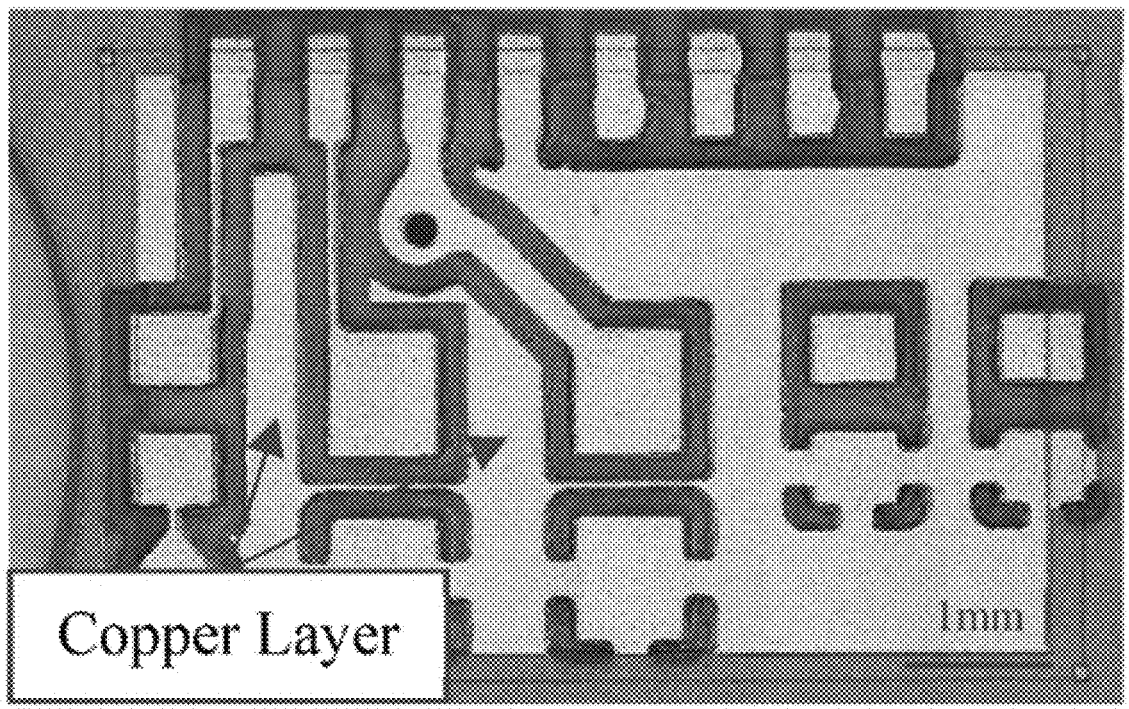
FIG. 8B illustrates a digital image of the PCB sample of FIG. 10A after a first number of cycles of laser ablation.
Figure 8C:
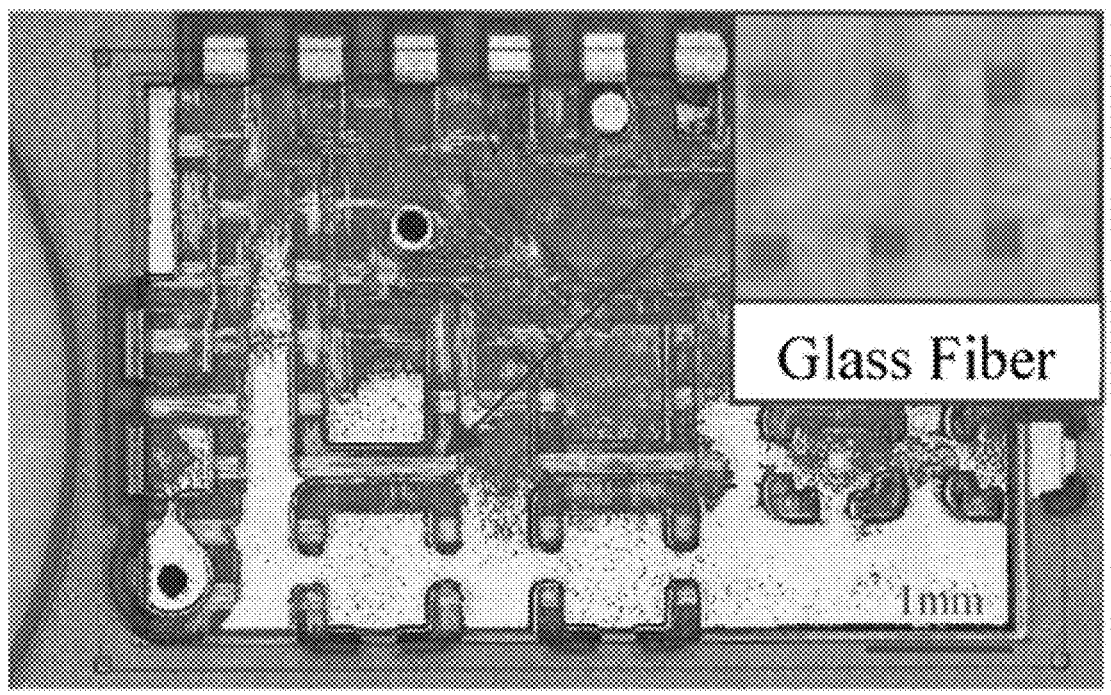
FIG. 8C illustrates a digital image of the PCB sample of FIG. 10A after a second number of cycles of laser ablation.
Figure 8D:
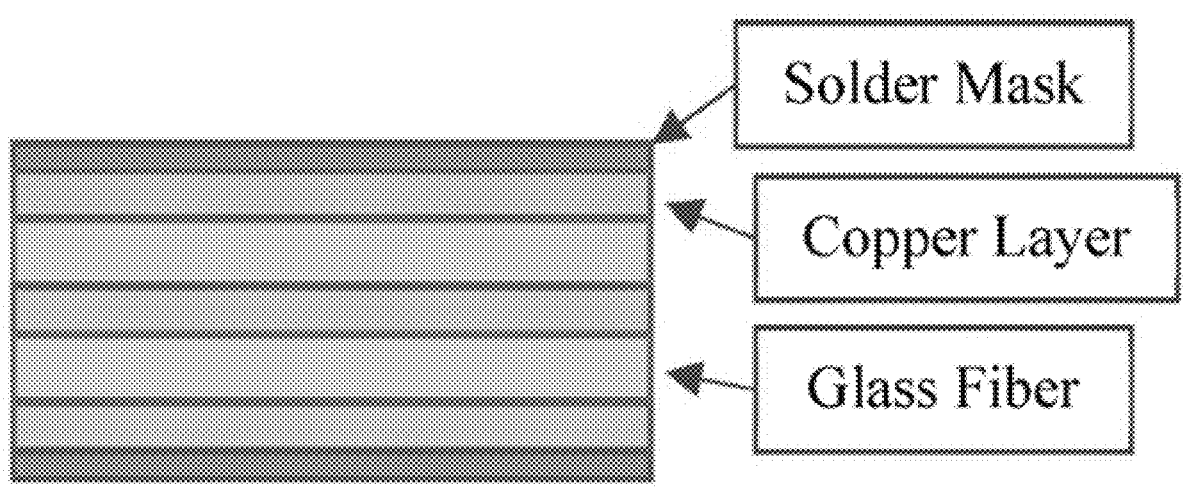
FIG. 8D is a schematic illustration of layers of a PCB cross-section.

The sample studied was a typical printed circuit board (PCB) including (1) insulating materials such as solder mask, (2) copper layers laminated to the substrates, and (3) glass fiber layers. FIGS. 8A-8D illustrate the different layers of the PCB sample. For example, FIGS. 8A and 8B illustrate a copper layer. FIG. 8C illustrates a glass fiber layer. FIG. 8D schematically illustrates a cross-section of the PCB sample and the various layers.

Figure 9:
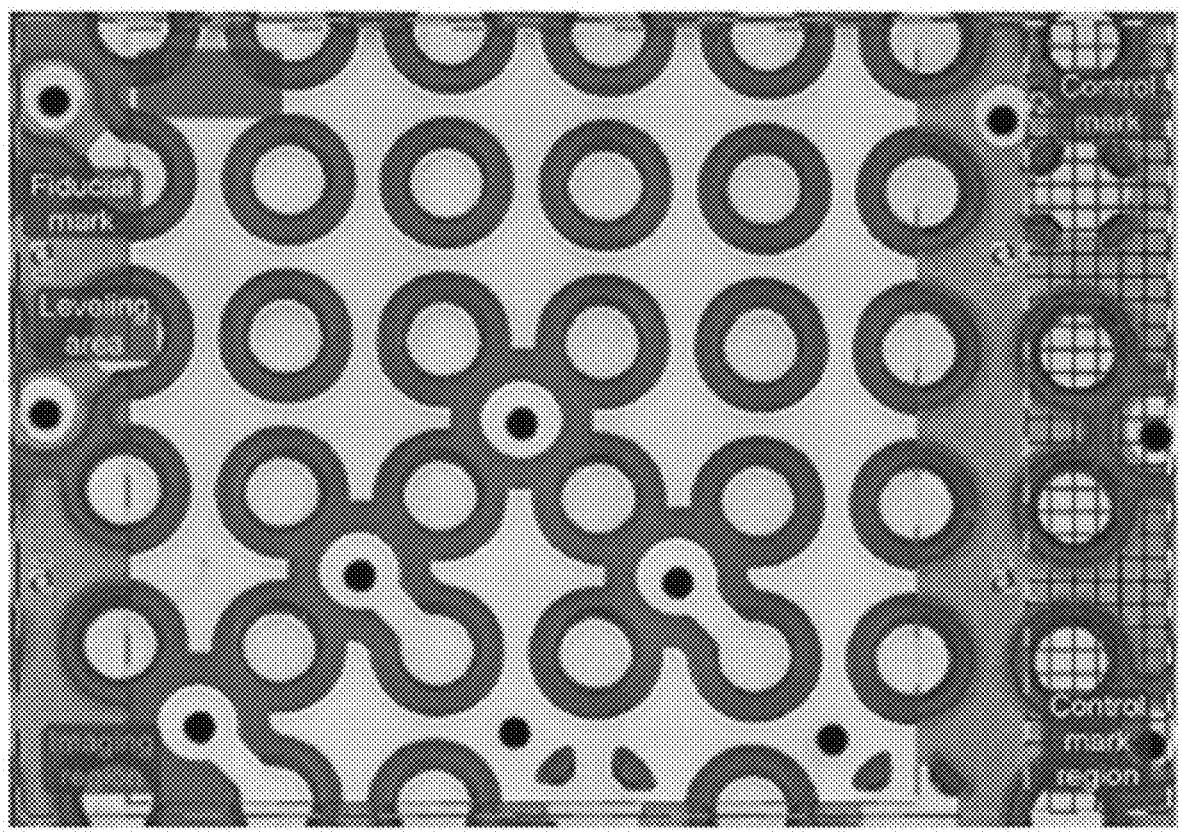
FIG. 9 illustrates a PCB sample including different regions, marks, and areas for a laser ablation process.

In this example, a control region and control marks were used as shown in FIG. 9. This was not required, but they were used to control and check the manual alignment of the PCB sample after moving the PCB sample from the microscope imaging system 125 to the machine system 100 for the next round of lasering.

The method 2000 was performed with the machine system 100 to generate a 3D image of the PCB sample. In particular, the laser source 117 comprised a 40 W laser (e.g, a MONACO® 1035-40-40 laser system available from Coherent Corp.) with 252 fs pulse width that produced a wide range of different pulse repetition rates, from single shots up to 50 MHz. The laser emitted a 2.75 mm diameter beam that went through a beam expander comprised of a fused silica 75 mm aspherical lens and a fused silica 300 mm convex lens to deliver a ~11 mm input beam diameter to a scan head (e.g., a SCANLAB intelliSCAN$_{se}$ 20 scan head available from SCANLAB GmbH) that can provide a 2 m/s marking speed. The beam then went through a telecentric scan lens (e.g., a fused silica Ronar-Smith® F-Theta scan lens model TSL-1064-10-56Q-D20 available from Wavelength Opto-Electronic(S) Pte Ltd) with an effective focal length of 70 mm. The resulting theoretical spot size within the setup was ~8.5 μm.

Additional details of the machine system 100 used in this example are shown in Table 1 below.

TABLE 1

| Equipment | Description | Resolution (μm) |
| --- | --- | --- |
| Keyence CL-P070G | Laser confocal height sensor: used for measuring height of sample to ensure accurate laser focus plane | 0.025 |
| Scanlabs IntelliSCANse20 | Laser scan head: utilizes two galvanometer mirrors to scan or raster laser across sample surface | <.4 urad repeatability 20 bit positioning resolution |
| Zaber X-LDA150A | XY stages: Translation of sample from sensor to scanner to vision system | 0.2 |
| Zaber VSR40A | Z stage: translation of sample to adjust focus during or prior to lasering | 0.09525 step size <1 repeatability |

The microscope imaging system 125 comprised a laser confocal microscope (e.g., a model VK-X3100 laser confocal microscope available from Keyence Corporation) used to obtain the 2D optical and 2D height information of the surface of the sample. A 10× objective lens was used. The numerical aperture for the lens was 0.3, its working distance was 16.5 mm, and its field of view varied from 168 μm×126 μm to 1849 μm×1386 μm. The largest field of view was when an optical zoom of 0.7× (expanding the field of view) was enabled. The resulting images consisted of 1024×768 pixels. Each pixel captured an area of 1.38 μm×1.38 μm on the PCB sample. The pitch in the z direction (i.e., the relative motion of the microscope head with respect to the sample for acquiring information from different heights) was 2 μm. This specific combination of lens and pitch size was chosen to ensure the required data resolution and to minimize the imaging time. To capture the entire ROI and the fiducial marks, a 6×5 array of images were stitched together. This is illustrated in FIG. 5A. Per the described specifications, the total imaged area was about 7.6 mm×4.8 mm. The total imaging time was about 5-30 min which varied based on the height range of the imaging region.

Figure 10:
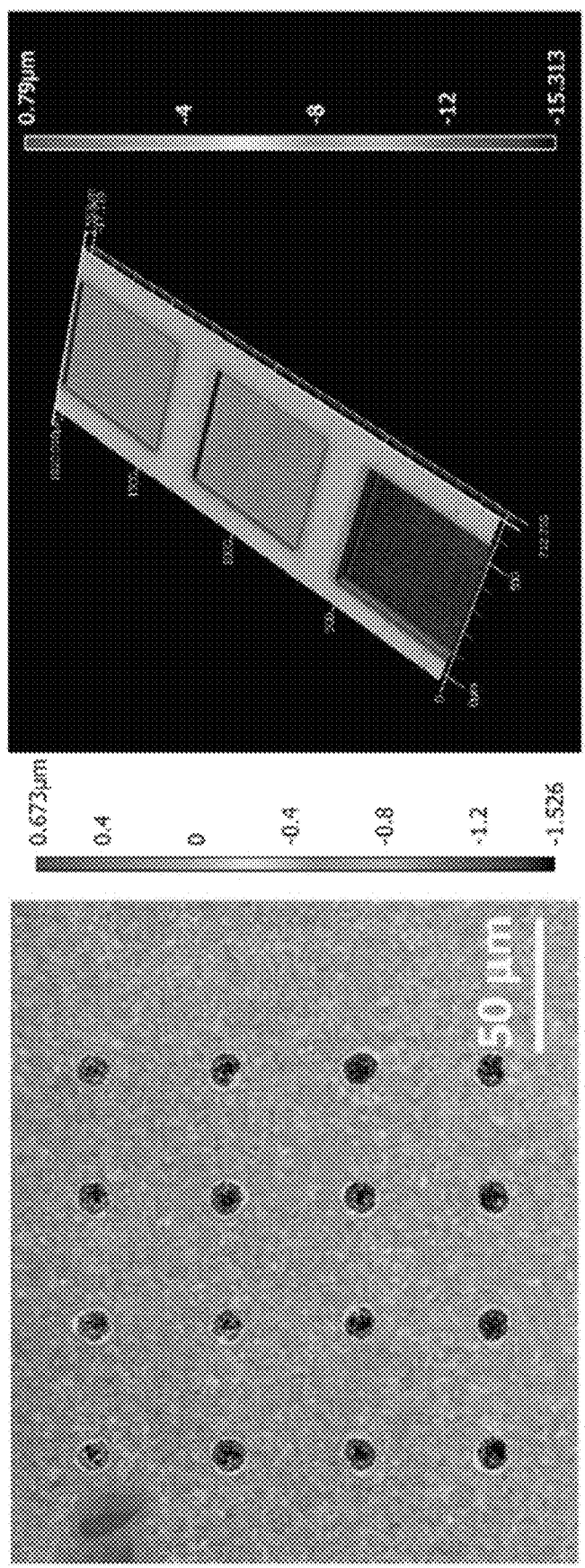
FIG. 10 are images that illustrate aspects of a target used in laser optimization experimentation. Single-pulse experiments on plastic, for fluence and EPP investigations (left)

As noted above, the laser interacted differently with different materials. To achieve the best delayering results, proper lasering/scanning parameters were selected based on the chemical composition of the PCB sample to increase throughput and to avoid unwanted phenomena such as melting that could otherwise impact the quality of the resulting 3D image. For the PCB sample, as mentioned above, the three main material compositions were copper, plastic, and glass fiber. A recipe-building process was conducted to find a single set of laser parameters that would be used to remove all three materials. The factors determining the selected recipe included material removal rate, material removal cleanliness, size of HAZ, and precision of laser triggering/scanning to prevent laser dwelling. To optimize the lasering/scanning parameters for plastic, glass fiber, and copper, the effects of the lasering parameters were studied through single laser pulses as well as through the formation of rectangular trenches. In all three cases, confocal microscopy was utilized for imaging, followed by image processing and data analysis steps. Parameters that were optimized included energy per pulse (EPP), fluence, repetition rate, and pulse overlap in x and y directions. FIG. 10 displays an example of the obtained data. The left part of FIG. 10 shows the single pulse experiments for plastic where fluence and EPP were optimized. The right part of FIG. 10 shows the trench experiments for copper, where the depth of cut, repetition rate, and overlap in x and y were optimized.

Table 2 summarizes the selected parameters for lasering and the processing time per lasering cycle for a 6.4 mm×4 mm ROI.

TABLE 2

| Fluence (J/cm²) | Repetition rate (MHz) | Scan speed (m/s) | X-overlap (%) | Y-overlap (%) | Time per cycle (6.2 mm × 4 mm) |
|---|---|---|---|---|---|
| 3.12 | 0.1 | 0.375 | 50 | 50 | 20 s |

The used fluence was greater than the ablation fluence for both copper and the substrate. The ablation threshold fluence for copper is reported to be 0.35 J/cm² for the 1035 nm wavelength. The ablation threshold fluence for the $SiO_2$ is reported to be 0.318 J/cm². For polyethylene terephthalate (PET) plastic, ablation fluences as low as 0.05 J/cm² have been tried but the optimal threshold has been reported to be 0.4 J/cm². An ablation fluence below 0.4 J/cm² leads to uncontrolled geometric changes in the shape of the micro-hole structures due to solidification of the melt components. The optimization of parameters may be conducted to prevent the distortion in the final 3D reconstructed image due to effects such as swelling and color change. The mitigation of HAZ to the extent that such aims were achieved was sufficient.

As a part of the parameter optimization process, eliminating lasering artifacts such as darkening was beneficial. There is a tradeoff between the laser ablation rate and the cleanliness of the delayering process, and the parameters used for laser delayering were selected based on parameter optimization. A key parameter used was energy per pulse (EPP). High values for EPP resulted in high ablation rates, but the surface quality and thus the accuracy of the final reconstructed 3D image was poor. FIG. 11 demonstrates the tradeoff between the throughput and quality.

While attempting to precisely delayer material, dwelling artifacts, which were caused by the tracking error of the scan head, were considered. Tracking errors can be caused by various reasons such as the acceleration/deceleration time of the scanning mirrors and the communication time with the controller. FIG. 12 depicts top/down and cross-sectional views of this artifact before (left side images) and after (right side images) correction. The correction was conducted utilizing an algorithm that took into consideration the size of the shape, which was being marked, the desired marking speed, the repetition rate of the laser, and the acceleration/deceleration of the mirrors. The algorithm generated precise delays in the order of microseconds applied for the on/off triggering of the laser. The delays ensured that at no time during marking, the overlap of pulses was more than specified. The presence of dwelling lead to increased HAZ and depth of cut, and obscuring features at a micrometer scale in precise delayering. In some examples, an alternative solution known as skywriting was used directly through the scanner system (e.g., scan heads available from SCANLAB GmbH). Skywriting added a run-in and run-off area to allow mirrors to pre-accelerate and post-decelerate for every line that is lasered, ensuring constant speed for the specified lines. The developed algorithm and the skywriting method were interchangeably used to eliminate dwelling issues. Both the developed algorithm and the skywriting method were used to eliminate the dwelling issues. FIG. 13 illustrates an example of dwelling caused by scanner mirror acceleration (left), and dwelling compensation utilizing a developed intelligent scanning system (right).

In some examples, the $CO_2$ nozzle 127 applied a snow cleaning method to clean the surface after each lasering cycle to maintain optimal laser ablation by preventing the redeposition from interfering with the next lasering cycle and welding back onto the PCB sample. The snow cleaning used a combination of dry ice particles and gaseous phase to effectively remove particles that were as small as 0.02 µm. The gas was fed into the nozzle, and the small orifice on the solenoid unit allowed a controlled expansion of high-pressure gas to atmospheric pressure accompanied by a large pressure drop that created small dry ice particles, referred to as "snow". It was contemplated that this process would help with mitigating heat-affected zones (HAZs) in two ways: (1) removing the redeposited material from the lasered surface using gas injection prevented these particles from melting onto the surface during the next lasering cycle, and (2) due to the low temperature of the incoming gas (near the triple-point), it could cool down the sample, potentially contributing to the mitigation of HAZs. HAZ should be avoided only to an extent that it does not create issues at the optical imaging step. It was contemplated that such a melting phenomenon was likely to happen because the redeposition would be at a different height than the rest of the surface. This would cause out-of-focus laser/matter interaction, which could lead to various heat-induced artifacts including melting. The heat-induced artifacts were manifested more significantly after a few cycles of lasering when no use of gas cleaning would result in piles of redeposited material on different regions of the sample. The optimization procedure to arrive at the right set of lasering/scanning parameters and gas injection took this measure into account. For each trial set of parameters, optical and confocal images were acquired for analysis of the resulting lasered surface. Application of gas cleaning/cooling also enabled deeper trenches and cleaner walls to be obtained. Obtaining high fidelity delayering is demonstrated with copper as shown in FIG. 16, which compared the effects of the presence (right image) and the absence (left image) of gas cooling on HAZ.

The image data obtained during the process of delayering may be registered, aligned, and leveled, to produce an accurate 3D dataset. In this example, four fiducial marks, in the shape of 100 µm×100 µm squares, were lasered on the area surrounding the to-be-delayered ROI (as illustrated in FIG. 9). The fiducial marks were expected to be in the corners of the acquired image. The algorithm obtained a black and white image using the information of the lowest point at each corner and looked for a square fiducial mark. When found, the centers of the fiducial marks represented the corners of a cropped image with a fixed width and height, for all images. Correction was performed for rotation and translation across all images. Further, to align the height maps in the vertical direction (the z direction, perpendicular to the xy plane), a tilt correction was performed. For leveling purposes, certain non-lasered areas around the fiducial marks were used. Three out of four squares were used for leveling by attempting to bring all of the squares to level 0. The fourth square was used for checking the performance of the leveling process. In some embodiments, after locating the fiducial marks by applying thresholding on the acquired height map, the x and y coordinates of the center of each square were extracted. Three centers were used for the correction of translation and rotation for registration of the image in a universal coordinate system. The fourth center was used as a cross-check.

As noted above, samples comprised of different materials, such as the PCB sample, experience different material removal rates at different regions, per the same lasering parameters. This results in height variations across the region of interest. Although, based on the height information provided by the confocal images, this, in principle, would not affect the quality of the final reconstructed 3D image, given the limitations of height range in a confocal image, sample surface height variation was kept within certain limits. Maintaining the sample surface height variation aided with examples where there was a limit on the allowed depth of cut for the entire sample. In some examples, a masking process was utilized, where at each step, based on the acquired height map, the lasering plan was programmed. The lasering plan indicated which regions were lasered, and the rest were skipped. By applying a 2-means algorithm on the heights, the different areas of the region of interest were partitioned into "low" and "high" classes. In some embodiments, at each lasering step, only the "high" areas were lasered. Consequently, all areas of the region of interest remained within a relatively small depth band during the entire process. FIG. 15 illustrates a generated mask for the next lasering step. The black areas were the areas to be lasered.

After acquiring the images, an image registration process was applied to generate aligned sets of optical/height images. This resulted in a set of optical images for which the height of each pixel was known. The lower and upper limits of height, across all pixels present in the dataset, determined the height range of the tomographic 3D image. Since the heights of pixels of the acquired optical images were known, such information was used to produce the corresponding voxels of the three-dimensional reconstruction image. For each voxel, two forms of information, namely the color and the material composition information were assigned. The color information was acquired optically, and the material composition information was deduced from the ablation rate information as described below. Further, a vertical linear interpolation between the known voxels provided an estimation of the remaining voxels between the known ones. It is important to note that, like the conventional volumetric imaging with flat layers, the accuracy of the final 3D image was controlled by the layer thickness at each step of delayering, which was controllable by lasering parameters.

The resolution of the resulting 3D reconstructed image was assessed from a lateral aspect and a vertical aspect. The lateral resolution of the 3D reconstructed image was determined by the optical imaging settings. The lateral resolution was 1.38 µm. The lateral resolution significantly improved by changing the imaging settings at the cost of longer imaging times. The vertical resolution of the 3D reconstructed image, however, was determined by two factors: (1) the laser delayering resolution, which specified the thickness of the removed layers, and (2) the vertical resolution of the height map acquired by the confocal microscope. The same set of lasering and scanning parameters were used for all the laser ablation processes. The removal rate was 5.7 µm/cycle for copper and 36.1 µm/cycle for glass fiber. The removal rate was significantly reduced by using a different set of laser parameters (e.g., one with lower EPP) at the cost of longer overall process times. The vertical resolution of the confocal height map was determined by a variable known as the pitch value (e.g., 2 µm). A lower pitch value may be used at the cost of longer imaging times.

A material detection approach based on lasering parameters and the surface parameters including depth of cut, roughness, and skewness of the lasered area was previously developed. However, the ablation rate distinguished between plastic and copper in the PCB sample. At every round of lasering, an area in the region of interest underwent lasering if it was present in the lasering mask. At each repeat, for each lasered area, the number of cycles this area was lasered as well as the lasering parameters were known. Based on the height difference (before and after lasering) and the number of lasering cycles, the material for every lasered area was predicted. The entire volume was divided into sub-volumes, each consisting of a group of voxels. Each sub-volume was assigned a label, indicating its material composition. Based on height variations, lasering artifacts, and lighting conditions, the same type of material may look slightly different in different regions of the sample, the material prediction establishes a much higher quality 3D image. The image was inherently segmented, negating the need for labor-intensive manual segmentation efforts.

In this example, the ablation rate was the sole parameter for differentiating materials. Material differentiation depended on the detectable height difference between different materials as they underwent laser processing, which in turn was determined by the vertical resolution of the confocal height sensor. Considering other surface metrics, such as roughness and skewness in conjunction with the ablation rate may improve the differentiation process. Copper, aluminum, silicon, and plastic may be easily distinguished based on their different interaction with the laser. Since only the height information obtained from the confocal microscope was used to differentiate between different materials, the color information, acquired by the optical microscope, would not affect the accuracy of the produced result regarding the material segmentation.

The results of applying the method 2000 on a PCB sample for acquiring an image with a total height range of about 700 µm are provided. FIGS. 16A-C illustrate a comparison of several selected xy-plane sections of the resulting 3D image of the PCB sample with the corresponding X-ray CT images of the PCB sample. As illustrated by FIGS. 16A-C, the resulting 3D image obtained by applying the method 2000 was richer in terms of information content. For example, the information that is deduced from the X-ray CT image was also visible in the optical/confocal 3D image. In addition, the resulting optical/confocal 3D image carries color information, helping distinguish different material compositions. Additionally, the high-resolution optical information from the glass fiber material that is provided using the method 2000, was absent from the X-ray CT images.

FIG. 17 shows a cross-sectional view of the volumetric image data of the PCB sample as collected by the microscope imaging system at different layers throughout the consecutive delayering/imaging procedure.

FIG. 18 illustrates the capability of the method for segmenting the resulting 3D image based on the ablation rate information. The left image of FIG. 18 is a heat map of the ablation rate, where red and yellow correspond to low and high ablation rates, respectively. For obtaining this image no information from the optical images was used. The right image shows the optical image of the same region.

All statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Various other components may be included and called upon for providing for aspects of the teachings herein. For example, additional materials, combinations of materials and/or omission of materials may be used to provide for added embodiments that are within the scope of the teachings herein. Adequacy of any particular element for practice of the teachings herein is to be judged from the perspective of a designer, manufacturer, seller, user, system operator or other similarly interested party, and such limitations are to be perceived according to the standards of the interested party.

In the disclosure hereof any element expressed as a means for performing a specified function is intended to encompass any way of performing that function including, for example, a) a combination of circuit elements and associated hardware which perform that function or b) software in any form, including, therefore, firmware, microcode or the like as set forth herein, combined with appropriate circuitry for executing that software to perform the function. Applicants thus regard any means which can provide those functionalities as equivalent to those shown herein. No functional language used in claims appended herein is to be construed as invoking 35 U.S.C. § 112 (f) interpretations as "means-plus-function" language unless specifically expressed as such by use of the words "means for" or "steps for" within the respective claim.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements. The term "exemplary" is not intended to be construed as a superlative example but merely one of many possible examples.

What is claimed is:

1. A system for generating a three-dimensional image of a sample, the system comprising:
    a platform configured to support the sample;
    a laser source configured to output a laser beam to remove material from the sample;
    a microscope imaging system; and
    a controller communicatively coupled to the laser source and the microscope imaging system, the controller configured to
        (a) acquire height data of a surface of the sample with a height sensor,
        (b) generate a mask based on the height data of the surface of the sample, the mask providing a laser cutting pattern for the sample,
        (c) acquire an image and a height map of the surface of the sample with the microscope imaging system,
        (d) activate the laser source to generate a laser beam to delayer the sample based on the mask, and
        repeat steps (a)-(d) to generate a three-dimensional image of the sample.

2. The system of claim 1, wherein the laser source is a femtosecond laser.

3. The system of claim 1, wherein the microscope imaging system is a confocal microscope, an electron microscope, or an ion microscope.

4. The system of claim 1, wherein the sample comprises copper, glass fiber, or plastic.

5. The system of claim 1, wherein the controller is further configured to
    generate instructions to the laser source to apply fiducial marks on the sample, and
    generate the three-dimensional image of the sample by reconstructing a plurality of the images and the height maps acquired through repetition of steps (a)-(d) by aligning the fiducial marks in each of the images and the height maps.

6. The system of claim 1, further comprising a $CO_2$ nozzle communicatively coupled to the controller.

7. The system of claim 6, wherein the controller is further configured to
    (e) activate the $CO_2$ nozzle to emit gas toward the sample to clean the surface of the sample after step (d).

8. The system of claim 1, wherein the controller is configured to generate the mask based on a predetermined height threshold to keep a height variation of the surface of the sample smaller than a predetermined limit.

9. The system of claim 1, further comprising
    a laser scan head communicatively coupled to the controller, the laser scan head configured to emit the laser beam toward the sample; and
    a confocal height sensor communicatively coupled to the controller, the confocal height sensor configured to detect a height between the sample and the laser scan head.

10. The system of claim 9, further comprising a stage communicatively coupled to the controller, the stage including the platform, and wherein the controller is configured to move the sample by moving the stage relative to the confocal height sensor and the microscope imaging system.

11. The system of claim 1, wherein the laser cutting pattern determines which regions of the sample are lasered and which regions of the sample are not lasered.

12. A method of generating a three-dimensional image of a PCB sample, the method comprising:
    (a) positioning the PCB sample on a stage;
    (b) identifying a region of interest of the PCB sample;
    (c) generating fiducial marks on the region of interest of the PCB sample with a laser;
    (d) moving the stage relative to a confocal microscope to acquire an optical image of the PCB sample and height information of a first surface of the PCB sample;
    (e) generating a mask providing a laser cutting pattern to expose a second surface of the PCB sample based on the height information of the first surface of the PCB sample;
    (f) activating the laser to delayer the PCB sample based on the laser cutting pattern for the second surface of the PCB sample;
    repeating steps (d)-(f); and
    generating a three-dimensional image of the PCB sample based on a plurality of the optical images and the height information of the plurality of surfaces of the PCB sample.

13. The method of claim 12, further comprising cleaning the PCB sample with a gas after the laser delayers the PCB sample.

14. The method of claim 12, wherein the laser is a femtosecond laser.

15. The method of claim 12, wherein the PCB sample comprises copper, glass fiber, and plastic.

16. The method of claim 12, further comprising aligning the plurality of the optical images of the plurality of surfaces of the PCB sample based on the fiducial marks in each of the plurality of the optical images.

17. The method of claim 12, wherein the mask is generated based on a predetermined height threshold to keep a height variation within each surface of the PCB sample smaller than a predetermined limit.

18. A system for generating a three-dimensional image of a sample, the system comprising:
    a stage configured to support the sample;
    a laser source configured to output a laser beam to remove material from the sample;
    a confocal height sensor;
    a confocal microscope;

a $CO_2$ nozzle; and a controller communicatively coupled to the stage, the laser source, the confocal height sensor, the confocal microscope, and the $CO_2$ nozzle, the controller configured to
- (a) move the stage to align the sample with the confocal microscope to acquire a two-dimensional optical image and a two-dimensional height map of a first surface of the sample with the confocal microscope,
- (b) generate a mask based on the two-dimensional height map of the first surface of the sample, the mask providing a laser cutting pattern to expose a second surface of the sample,
- (c) activate the laser source to generate a laser beam to delayer the sample based on the mask,
- (d) activate the $CO_2$ nozzle to remove debris from the second surface of the sample,
- (e) process the two-dimensional image data and the two-dimensional height map for the first surface to generate a three-dimensional image of the first surface, and repeat steps (a)-(e) to generate a three-dimensional image of the sample by stacking a plurality of the three-dimensional images of each of the surfaces of the sample.

19. The system of claim 18, wherein the mask is generated based on a predetermined height threshold to keep a height variation within each surface smaller than a predetermined limit.

20. The system of claim 18, wherein the controller is configured to synchronize movement of the stage with the laser beam for delayering the sample.

\* \* \* \* \*